(12) United States Patent
Ye et al.

(10) Patent No.: US 12,402,150 B2
(45) Date of Patent: Aug. 26, 2025

(54) ENHANCED SIDELINK SENSING AND RESOURCE ALLOCATION

(71) Applicant: Apple Inc., Cupertino, CA (US)

(72) Inventors: Chunxuan Ye, San Diego, CA (US); Dawei Zhang, Saratoga, CA (US); Wei Zeng, Saratoga, CA (US); Haitong Sun, Cupertino, CA (US); Weidong Yang, San Diego, CA (US); Hong He, San Jose, CA (US); Seyed Ali Akbar Fakoorian, San Diego, CA (US); Yushu Zhang, Beijing (CN); Chunhai Yao, Beijing (CN); Jie Cui, San Jose, CA (US)

(73) Assignee: Apple Inc., Cupertino, CA (US)

( * ) Notice: Subject to any disclaimer, the term of this patent is extended or adjusted under 35 U.S.C. 154(b) by 57 days.

(21) Appl. No.: 17/995,567

(22) PCT Filed: May 10, 2021

(86) PCT No.: PCT/CN2021/092788
§ 371 (c)(1),
(2) Date: Oct. 5, 2022

(87) PCT Pub. No.: WO2022/236584
PCT Pub. Date: Nov. 17, 2022

(65) Prior Publication Data
US 2024/0298337 A1  Sep. 5, 2024

(51) Int. Cl.
*H04W 72/40* (2023.01)

(52) U.S. Cl.
CPC ................................ *H04W 72/40* (2023.01)

(58) Field of Classification Search
CPC ........................................................ H04W 72/40
See application file for complete search history.

(56) References Cited

U.S. PATENT DOCUMENTS

| 2018/0103490 A1* | 4/2018 | Li ...................... H04W 74/085 |
| 2019/0182840 A1* | 6/2019 | Feng ................ H04W 74/0816 |

(Continued)

FOREIGN PATENT DOCUMENTS

| WO | 2019006706 A1 | 1/2019 |
| WO | 2021085992 A1 | 5/2021 |

OTHER PUBLICATIONS

Intel Corporation, "Physical Layer Procedures for NR V2X Sidelink Communication," 3GPP TSG RAN WG1 Meeting #95, R1-1812489, Nov. 3, 2018.

(Continued)

*Primary Examiner* — Jael M Ulysse
(74) *Attorney, Agent, or Firm* — Blank Rome LLP

(57) ABSTRACT

Techniques for power savings by a wireless device. The technique including determining, by a first wireless device, a sidelink resources pool including a set of sidelink resources for communicating directly with a second wireless device; determining one or more reservation periods associated with resources of the sidelink resources pool; determining a number of sensing occasions based on the one or more reservation periods; sensing a wireless medium within the sidelink resources pool based on the determined number of sensing occasions and the determined one or more reservation periods; selecting a set of candidate resources from the sidelink resources pool based on the sensing; and transmitting data to the second wireless device based on the selected set of candidate resources.

18 Claims, 11 Drawing Sheets

(56) References Cited

U.S. PATENT DOCUMENTS

| | | | |
|---|---|---|---|
| 2020/0059844 A1 | 2/2020 | Lee | |
| 2020/0220694 A1* | 7/2020 | Khoryaev | H04W 28/04 |
| 2020/0229144 A1* | 7/2020 | Bharadwaj | H04W 72/20 |
| 2020/0275458 A1* | 8/2020 | Khoryaev | H04W 72/25 |
| 2021/0084660 A1* | 3/2021 | Taherzadeh Boroujeni | H04L 5/0057 |
| 2022/0060929 A1* | 2/2022 | Hassan | H04W 28/0284 |
| 2022/0078758 A1* | 3/2022 | Lee | H04L 5/0053 |
| 2022/0225280 A1* | 7/2022 | Yang | H04W 52/0235 |
| 2022/0225408 A1* | 7/2022 | Lee | H04W 4/40 |
| 2022/0279536 A1* | 9/2022 | Khsiba | H04W 72/1263 |
| 2022/0322304 A1* | 10/2022 | Hui | H04W 72/044 |
| 2022/0350659 A1* | 11/2022 | Ding | H04W 72/02 |
| 2022/0377733 A1* | 11/2022 | Ko | H04L 5/0037 |
| 2022/0394735 A1* | 12/2022 | Lee | H04W 4/40 |
| 2023/0007669 A1* | 1/2023 | Peng | H04W 72/542 |
| 2023/0020105 A1* | 1/2023 | Shin | H04W 72/542 |
| 2023/0028098 A1* | 1/2023 | Lin | H04W 72/0446 |
| 2023/0080200 A1* | 3/2023 | Hui | H04W 72/56 370/329 |
| 2023/0126112 A1* | 4/2023 | Lin | H04W 72/02 370/329 |
| 2023/0171794 A1* | 6/2023 | Yoshioka | H04W 4/70 370/329 |
| 2023/0217317 A1* | 7/2023 | Zhao | H04W 28/26 370/329 |
| 2023/0300799 A1* | 9/2023 | Lee | H04W 72/02 |
| 2023/0345422 A1* | 10/2023 | Lin | H04W 76/28 |
| 2023/0354386 A1* | 11/2023 | Hui | H04W 72/20 |
| 2023/0354468 A1* | 11/2023 | Park | H04W 52/0219 |
| 2023/0413238 A1* | 12/2023 | Ryu | H04B 7/0617 |
| 2024/0031997 A1* | 1/2024 | Lin | H04W 4/40 |
| 2024/0057211 A1* | 2/2024 | Palenius | H04W 72/25 |
| 2024/0236949 A1* | 7/2024 | Ko | H04W 72/02 |

OTHER PUBLICATIONS

International Search Report received in PCT Application No. PCT/CN2021/092788, Feb. 10, 2022.

Fujitsu: "Considerations on partial sensing and DRX in NR sidelink", 3GPP Draft; R1-2102719, 3rd Generation Partnership Project (3GPP), Mobile Competence Centre ; 650, Route Des Lucioles ; F-06921 Sophia-Antipolis Cedex ; France, vol. RAN WG1, No. e-Meeting; Apr. 12, 2021-Apr. 20, 2021 Apr. 6, 2021 (Apr. 6, 2021), XP051993189, Retrieved from the Internet: URL:https://ftp.3gpp.org/tsg_ran/VVG1_RL1/TSGR1_104b-e/Docs/R1-2102719.zip R1-2102719 Considerations on partial sensing and DRX in NR sidelink.docx.

Apple: "Discussion on Sidelink Resource Allocation for Power Saving", 3GPP Draft; R1-2103121, 3rd Generation Partnership Project (3GPP), Mobile Competence Centre ; 650, Route Des Lucioles ; F-06921 Sophia-Antipolis Cedex ; France, vol. RAN WG1, No. e-Meeting; Apr. 12, 2021-Apr. 20, 2021 Apr. 7, 2021 (Apr. 7, 2021), XP052177922, Retrieved from the Internet: URL:https://ftp.3gpp.org/tsg_ran/VVG1_RL1/TSGR1_104b-e/Docs/R1-2103121.zip R1-2103121 Discussion on Sidelink Resource Allocation for Power Saving.docx.

Huawei et al: "Sidelink resource allocation to reduce power consumption", 3GPP Draft; R1-2102323, 3rd Generation Partnership Project (3GPP), Mobile Competence Centre ; 650, Route Des Lucioles ; F-06921 Sophia-Antipolis Cedex ; France, vol. RAN WG1, No. E-meeting; Apr. 12, 2021-Apr. 20, 2021 Apr. 7, 2021 (Apr. 7, 2021), XP052177043, Retrieved from the Internet: URL:https://ftp.3gpp.org/tsg_ran/VVG1_RL1/TSGR1_104b-e/Docs/R1-2102323.zip R1-2102323.docx [retrieved on Apr. 7, 2021].

* cited by examiner

ENHANCED SIDELINK SENSING AND RESOURCE ALLOCATION

FIELD

The present application relates to wireless devices and wireless networks including devices, computer-readable media, and methods for enhancing sidelink sensing and resource allocation.

BACKGROUND

Wireless communication systems are rapidly growing in usage. In recent years, wireless devices such as smart phones and tablet computers have become increasingly sophisticated. In addition to supporting telephone calls, many mobile devices now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (associated with, for example, WCDMA or TD-SCDMA air interfaces), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), BLUETOOTH™, etc.

The ever increasing number of features and functionality introduced in wireless communication devices also creates a continuous need for improvement in both wireless communications and in wireless communication devices. To increase coverage and better serve the increasing demand and range of envisioned uses of wireless communication, in addition to the communication standards mentioned above, there are further wireless communication technologies under development, including fifth generation (5G) new radio (NR) communication. Accordingly, improvements in the field in support of such development and design are desired.

SUMMARY

Aspects relate to devices, computer-readable media, and methods for enhancing sidelink sensing and sidelink resource allocation. These aspects include determining, by a first wireless device, a sidelink resources pool including a set of sidelink resources for communicating directly with a second wireless device; determining one or more reservation periods associated with resources of the sidelink resources pool; determining a number of sensing occasions based on the one or more reservation periods; sensing a wireless medium within the sidelink resources pool based on the determined number of sensing occasions and the determined one or more reservation periods; selecting a set of candidate resources from the sidelink resources pool based on the sensing; and transmitting data to the second wireless device based on the selected set of candidate resources.

Another aspect relates to devices, computer-readable media, and methods for determining, by a first wireless device, a sidelink resources pool including a set of sidelink resources for communicating directly with a second wireless device; sensing a wireless medium within the sidelink resources pool; selecting a set of candidate resources from the sidelink resources pool based on the sensing; receiving a coordination message from a third wireless device, the coordination message indicating a first set of identified resources by the third wireless device; selecting a second set of identified resources based on the set of candidate resources and first set of identified resources; and transmitting the selected second set of identified resources to the second wireless device.

The techniques described herein may be implemented in and/or used with a number of different types of devices, including but not limited to cellular phones, wireless devices, tablet computers, wearable computing devices, portable media players, and any of various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF DRAWINGS

A better understanding of the present subject matter can be obtained when the following detailed description of various aspects is considered in conjunction with the following drawings.

Figure 1:
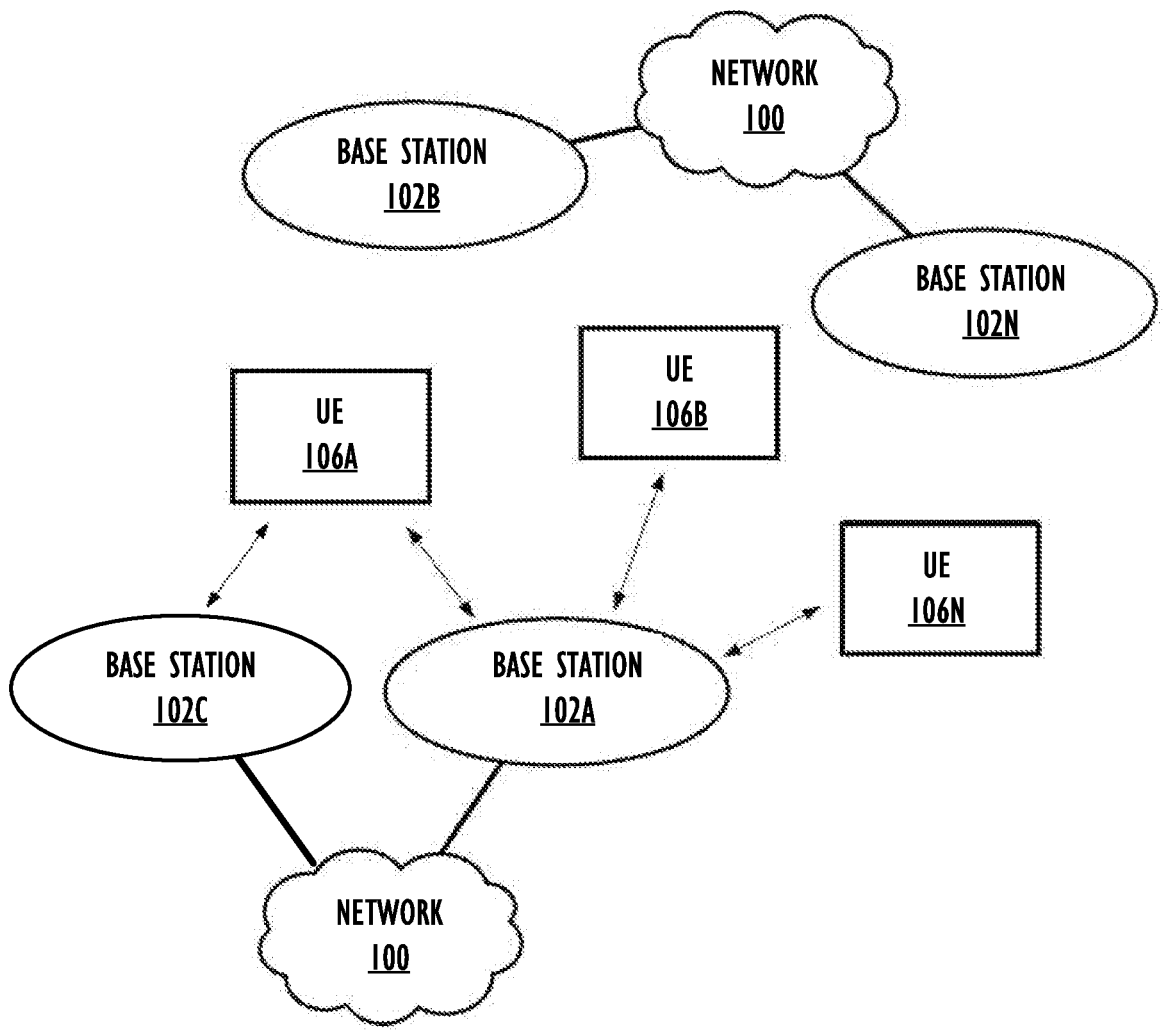
FIG. 1 illustrates an example wireless communication system, according to some aspects.

While the features described herein may be susceptible to various modifications and alternative forms, specific aspects thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

In certain wireless communications systems, a wireless device may communicate directly with another wireless device without being routed through, for example, a wireless node. For example, a wireless device may establish a sidelink session with another peer wireless device. Once the sidelink session is established, the wireless device may monitor for messages from the other peer wireless device and vice versa. To help reduce power consumption, techniques to reduce an amount of monitoring by the wireless device may be provided for detecting periodic transmissions by other peer wireless devices. In addition, peer wireless devices may provide coordination information and techniques may be provided for incorporating the provided coordination information.

The following is a glossary of terms that may be used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic."

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (also "User Device" or "UE Device")—any of various types of computer systems or devices that are mobile or portable and that perform wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g., smart watch, smart glasses), PDAs, portable Internet devices, music players, data storage devices, other handheld devices, in-vehicle infotainment (IVI), in-car entertainment (ICE) devices, an instrument cluster, head-up display (HUD) devices, onboard diagnostic (OBD) devices, dashtop mobile equipment (DME), mobile data terminals (MDTs), Electronic Engine Management System (EEMS), electronic/engine control units (ECUs), electronic/engine control modules (ECMs), embedded systems, microcontrollers, control modules, engine management systems (EMS), networked or "smart" appliances, machine type communications (MTC) devices, machine-to-machine (M2M), internet of things (IOT) devices, etc. In general, the term "UE" or "UE device" can be broadly defined to encompass any electronic, computing, and/or telecommunications device (or combination of devices) which is transportable by a user and capable of wireless communication.

Wireless Device—any of various types of computer systems or devices that perform wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "base station" or "wireless station" has the full breadth of its ordinary meaning, and at least includes a wireless communication station installed at a fixed location and used to communicate as part of a wireless telephone system or radio system. For example, if the base station is implemented in the context of LTE, it may alternately be referred to as an 'eNodeB' or 'eNB'. If the base station is implemented in the context of 5G NR, it may alternately be referred to as a 'gNodeB' or 'gNB'. Although certain aspects are described in the context of LTE or 5G NR, references to "eNB," "gNB," "nodeB," "base station," "NB," etc., may refer to one or more wireless nodes that service a cell to provide a wireless connection between user devices and a wider network generally and that the concepts discussed are not limited to any particular wireless technology. Although certain aspects are described in the context of LTE or 5G NR, references to "eNB," "gNB," "nodeB," "base station," "NB," etc., are not intended to limit the concepts discussed herein to any particular wireless technology and the concepts discussed may be applied in any wireless system.

Node—The term "node," or "wireless node" as used herein, may refer to one more apparatus associated with a cell that provide a wireless connection between user devices and a wired network generally.

Processing Element (or Processor)—refers to various elements or combinations of elements that are capable of performing a function in a device, such as a user equipment or a cellular network device. Processing elements may include, for example: processors and associated memory, portions or circuits of individual processor cores, entire processor cores, individual processors, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some aspects, "approximately" may mean within 0.1% of some specified or desired value, while in various other aspects, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Example Wireless Communication System

Turning now to FIG. 1, a simplified example of a wireless communication system is illustrated, according to some aspects. It is noted that the system of FIG. 1 is merely one example of a possible system, and that features of this disclosure may be implemented in any of various systems, as desired.

As shown, the example wireless communication system includes a base station 102A, which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102A may be a base transceiver station (BTS) or cell site (a "cellular base station") and may include hardware that enables wireless communication with the UEs 106A through 106N.

The communication area (or coverage area) of the base station may be referred to as a "cell." The base station 102A and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1xRTT, 1xEV-DO, HRPD, eHRPD), etc. Note that if the base station 102A is implemented in the context of LTE, it may alternately be referred to as an 'eNodeB' or 'eNB'. Note that if the base station 102A is implemented in the context of 5G NR, it may alternately be referred to as a 'gNodeB' or 'gNB'.

In some embodiments, the UEs 106 may be IoT UEs, which may comprise a network access layer designed for low-power IoT applications utilizing short-lived UE connections. An IoT UE can utilize technologies such as M2M or MTC for exchanging data with an MTC server or device via a public land mobile network (PLMN), proximity service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. As an example, vehicles to everything (V2X) may utilize ProSe features using a PC5 interface for direct communications between devices. The IoT UEs may also execute background applications (e.g., keep-alive messages, status updates, etc.) to facilitate the connections of the IoT network.

As shown, the UEs 106, such as UE 106A and UE 106B, may directly exchange communication data via a PC5 interface 108. The PC5 interface 105 may comprise one or more logical channels, including but not limited to a physical sidelink shared channel (PSSCH), a physical sidelink control channel (PSCCH), a physical sidelink broadcast channel (PSBCH), and a physical sidelink feedback channel (PSFCH).

In V2X scenarios, one or more of the base stations 102 may be or act as Road Side Units (RSUs). The term RSU may refer to any transportation infrastructure entity used for V2X communications. An RSU may be implemented in or by a suitable wireless node or a stationary (or relatively stationary) UE, where an RSU implemented in or by a UE may be referred to as a "UE-type RSU," an RSU implemented in or by an eNB may be referred to as an "eNB-type RSU," an RSU implemented in or by a gNB may be referred to as a "gNB-type RSU," and the like. In one example, an RSU is a computing device coupled with radio frequency circuitry located on a roadside that provides connectivity support to passing vehicle UEs (vUEs). The RSU may also include internal data storage circuitry to store intersection map geometry, traffic statistics, media, as well as applications/software to sense and control ongoing vehicular and pedestrian traffic. The RSU may operate on the 5.9 GHz Intelligent Transport Systems (ITS) band to provide very low latency communications required for high speed events, such as crash avoidance, traffic warnings, and the like. Additionally, or alternatively, the RSU may operate on the cellular V2X band to provide the aforementioned low latency communications, as well as other cellular communications services. Additionally, or alternatively, the RSU may operate as a Wi-Fi hotspot (2.4 GHz band) and/or provide connectivity to one or more cellular networks to provide uplink and downlink communications. The computing device(s) and some or all of the radio frequency circuitry of the RSU may be packaged in a weatherproof enclosure suitable for outdoor installation, and may include a network interface controller to provide a wired connection (e.g., Ethernet) to a traffic signal controller and/or a backhaul network.

As shown, the base station 102A may also be equipped to communicate with a network 100 (e.g., a core network of a cellular service provider, a telecommunication network such as a public switched telephone network (PSTN), and/or the Internet, among various possibilities). Thus, the base station 102A may facilitate communication between the user devices and/or between the user devices and the network 100. In particular, the cellular base station 102A may provide UEs 106 with various telecommunication capabilities, such as voice, SMS and/or data services.

Base station 102A and other similar base stations (such as base stations 102B . . . 102N) operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102A may act as a "serving cell" for UEs 106A-N as illustrated in FIG. 1, each UE 106 may also be capable of receiving signals from (and possibly within communication range of) one or more other cells (which might be provided by base stations 102B-N and/or any other base stations), which may be referred to as "neighboring cells." Such cells may also be capable of facilitating communication between user devices and/or between user devices and the network 100. Such cells may include "macro" cells, "micro" cells, "pico" cells, and/or cells which provide any of various other granularities of service area size. For example, base stations 102A-B illustrated in FIG. 1 might be macro cells, while base station 102N might be a micro cell. Other configurations are also possible.

In some aspects, base station 102A may be a next generation base station, e.g., a 5G New Radio (5G NR) base station, or "gNB." In some aspects, a gNB may be connected to a legacy evolved packet core (EPC) network and/or to a NR core (NRC)/5G core (5GC) network. In addition, a gNB cell may include one or more transition and reception points (TRPs). In addition, a UE capable of operating according to 5G NR may be connected to one or more TRPs within one or more gNBs. For example, it may be possible that that the base station 102A and one or more other base stations 102 support joint transmission, such that UE 106 may be able to receive transmissions from multiple base stations (and/or multiple TRPs provided by the same base station). For example, as illustrated in FIG. 1, both base station 102A and base station 102C are shown as serving UE 106A.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1xRTT, 1xEV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Example User Equipment (UE)

Figure 2:
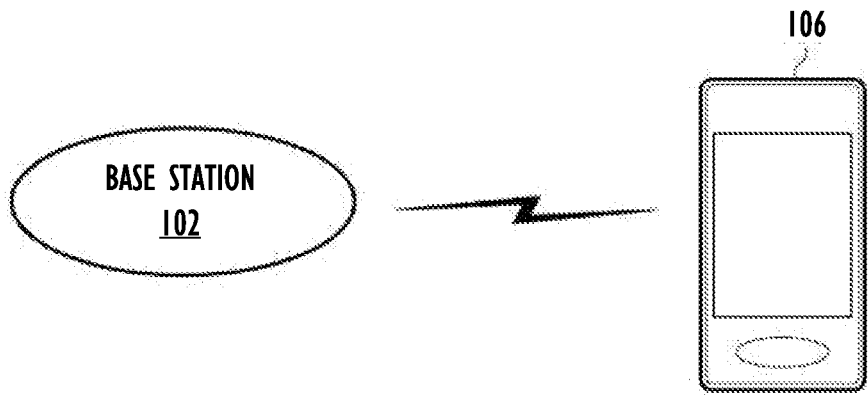
FIG. 2 illustrates a base station (BS) in communication with a user equipment (UE) device, according to some aspects.

FIG. 2 illustrates user equipment 106 (e.g., one of the devices 106A through 106N) in communication with a base station 102, according to some aspects. The UE 106 may be a device with cellular communication capability such as a mobile phone, a hand-held device, a computer, a laptop, a tablet, a smart watch or other wearable device, or virtually any type of wireless device.

The UE 106 may include a processor (processing element) that is configured to execute program instructions stored in memory. The UE 106 may perform any of the method aspects described herein by executing such stored instructions. Alternatively, or in addition, the UE 106 may include a programmable hardware element such as an FPGA (field-programmable gate array), an integrated circuit, and/or any of various other possible hardware components that are configured to perform (e.g., individually or in combination) any of the method aspects described herein, or any portion of any of the method aspects described herein.

The UE 106 may include one or more antennas for communicating using one or more wireless communication protocols or technologies. In some aspects, the UE 106 may be configured to communicate using, for example, NR or LTE using at least some shared radio components. As additional possibilities, the UE 106 could be configured to communicate using CDMA2000 (1xRTT/1xEV-DO/HRPD/eHRPD) or LTE using a single shared radio and/or GSM or LTE using the single shared radio. The shared radio may couple to a single antenna, or may couple to multiple antennas (e.g., for MIMO) for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some aspects, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or either of LTE or 1xRTT, or either of LTE or GSM, among various possibilities), and separate radios for communicating using each of Wi-Fi and Bluetooth. Other configurations are also possible.

In some embodiments, a downlink resource grid can be used for downlink transmissions from any of the base stations 102 to the UEs 106, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid may comprise a number of resource blocks, which describe the mapping of certain physical channels to resource elements. Each resource block comprises a collection of resource elements. There are several different physical downlink channels that are conveyed using such resource blocks.

The physical downlink shared channel (PDSCH) may carry user data and higher-layer signaling to the UEs 106. The physical downlink control channel (PDCCH) may carry information about the transport format and resource allocations related to the PDSCH channel, among other things. It may also inform the UEs 106 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the base stations 102 based on channel quality information fed back from any of the UEs 106. The downlink resource assignment information may be sent on the PDCCH used for (e.g., assigned to) each of the UEs.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Example Communication Device

Figure 3:
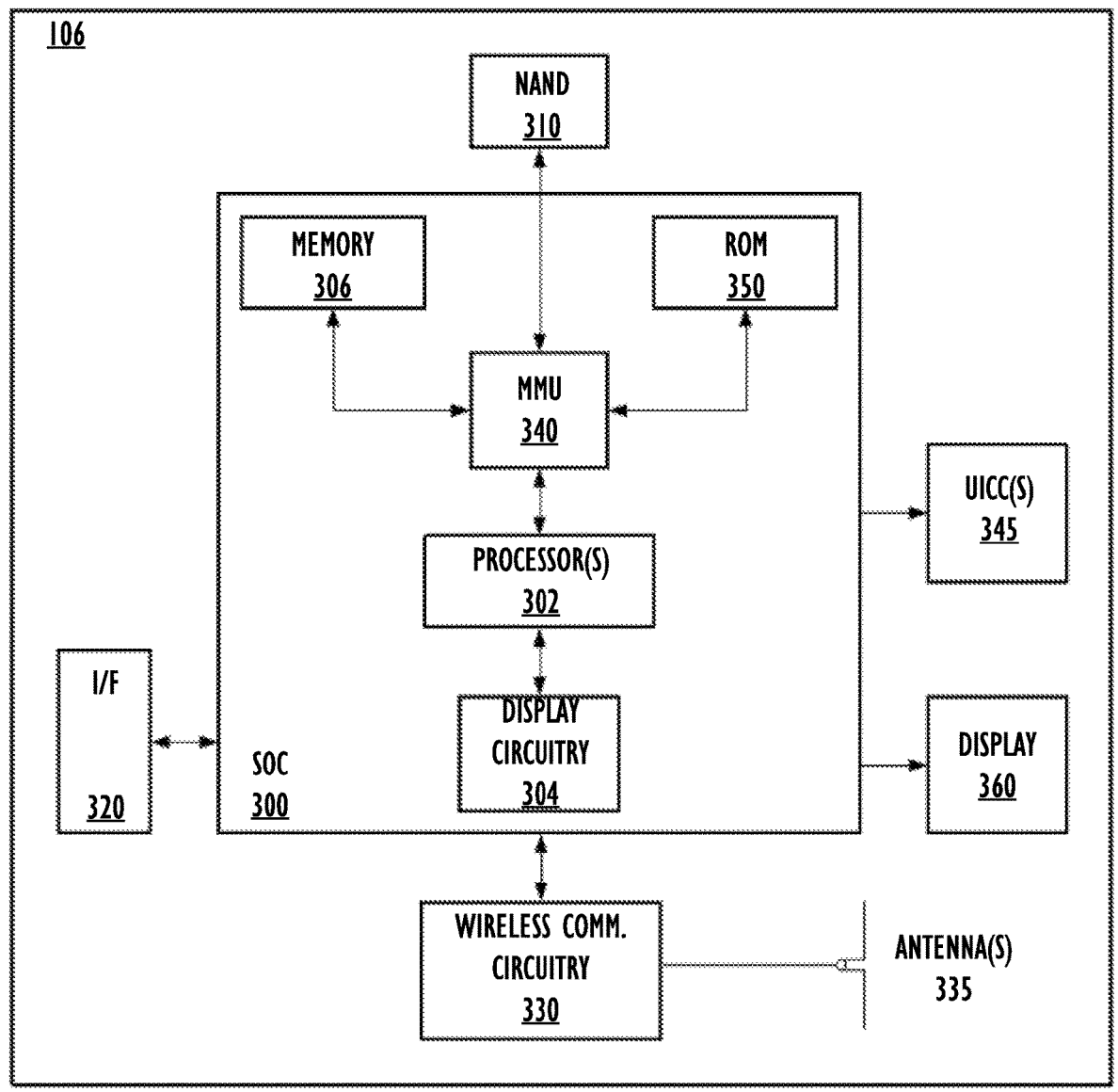
FIG. 3 illustrates an example block diagram of a UE, according to some aspects.

FIG. 3 illustrates an example simplified block diagram of a communication device 106, according to some aspects. It is noted that the block diagram of the communication device of FIG. 3 is only one example of a possible communication device. According to aspects, communication device 106 may be a user equipment (UE) device, a mobile device or mobile station, a wireless device or wireless station, a desktop computer or computing device, a mobile computing device (e.g., a laptop, notebook, or portable computing device), a tablet, and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and wireless communication circuitry 330 (e.g., for LTE, LTE-A, NR, UMTS, GSM, CDMA2000, Bluetooth, Wi-Fi, NFC, GPS, etc.). In some aspects, communication device 106 may include wired communication circuitry (not shown), such as a network interface card, e.g., for Ethernet.

The wireless communication circuitry 330 may couple (e.g., communicatively; directly or indirectly) to one or more antennas, such as antenna(s) 335 as shown. The wireless communication circuitry 330 may include cellular communication circuitry and/or short to medium range wireless communication circuitry, and may include multiple receive chains and/or multiple transmit chains for receiving and/or transmitting multiple spatial streams, such as in a multiple-input multiple output (MIMO) configuration.

In some aspects, as further described below, cellular communication circuitry 330 may include one or more receive chains (including and/or coupled to (e.g., communicatively; directly or indirectly) dedicated processors and/or radios) for multiple RATs (e.g., a first receive chain for LTE and a second receive chain for 5G NR). In addition, in some aspects, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with a second radio. The second radio may be dedicated to a second RAT, e.g., 5G NR, and may be in communication with a dedicated receive chain and the shared transmit chain. In some aspects, the second RAT may operate at mmWave frequencies. As mmWave systems operate in higher frequencies than typically found in LTE systems, signals in the mmWave frequency range are heavily attenuated by environmental factors. To help address this attenuating, mmWave systems often utilize beamforming and include more antennas as compared LTE systems. These antennas may be organized into antenna arrays or panels made up of individual antenna elements. These antenna arrays may be coupled to the radio chains.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330, connector I/F 320, and/or display 360. The MMU 340 may be configured to perform memory protection and page table translation or set up. In some aspects, the MMU 340 may be included as a portion of the processor(s) 302.

As noted above, the communication device 106 may be configured to communicate using wireless and/or wired communication circuitry. As described herein, the communication device 106 may include hardware and software components for implementing any of the various features and techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, wireless communication circuitry 330 may include one or more processing elements. In other words, one or more processing elements may be included in wireless communication circuitry 330. Thus, wireless communication circuitry 330 may include one or more integrated circuits (ICs) that are configured to perform the functions of wireless communication circuitry 330. In addition, each integrated circuit may include circuitry (e.g., first circuitry, second circuitry, etc.) configured to perform the functions of wireless communication circuitry 330.

Example Base Station

Figure 4:
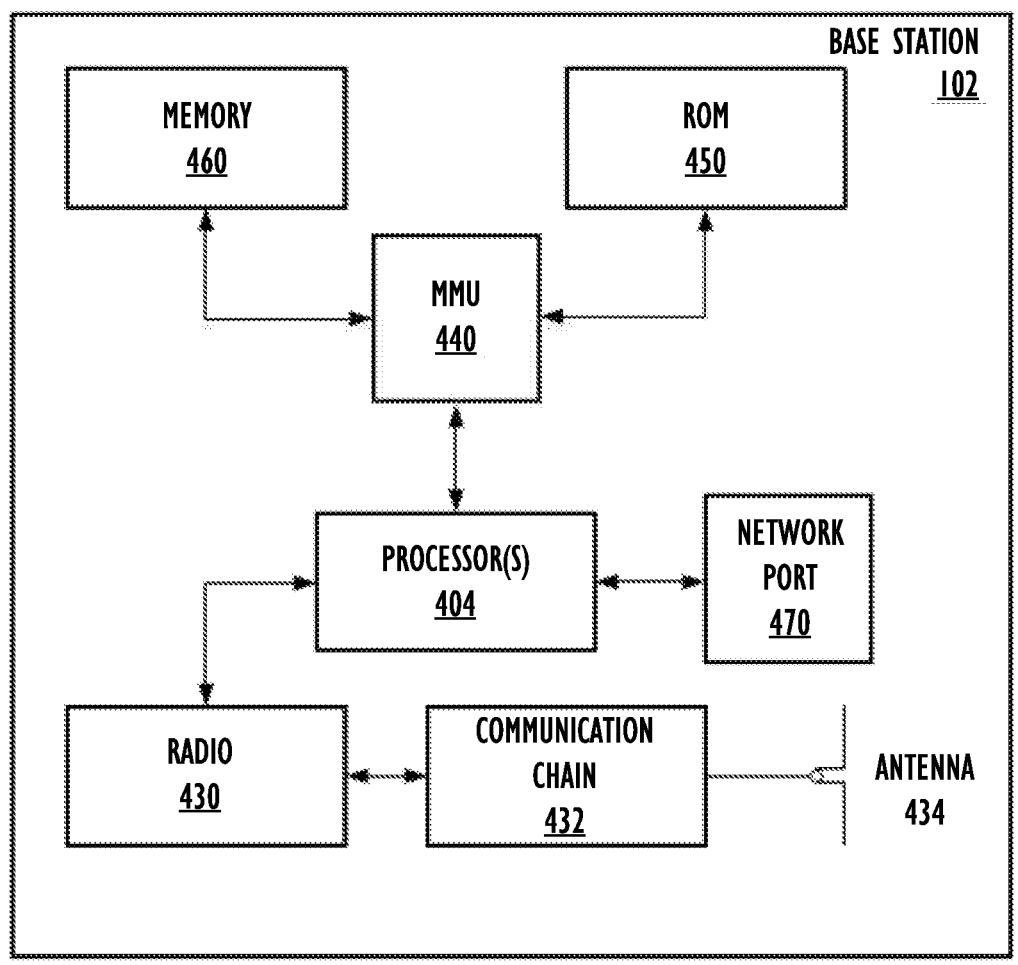
FIG. 4 illustrates an example block diagram of a BS, according to some aspects.

FIG. 4 illustrates an example block diagram of a base station 102, according to some aspects. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some aspects, base station 102 may be a next generation base station, e.g., a 5G New Radio (5G NR) base station, or "gNB." In such aspects, base station 102 may be connected to a legacy evolved packet core (EPC) network and/or to a NR core (NRC)/5G core (5GC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. When the base station 102 supports mmWave, the 5G NR radio may be coupled to one or more mmWave antenna arrays or panels. As another possibility, the base station 102 may include a multi-mode radio, which is capable of performing communications according to any of multiple wireless communication technologies (e.g., 5G NR and LTE, 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Example Cellular Communication Circuitry

Figure 5:
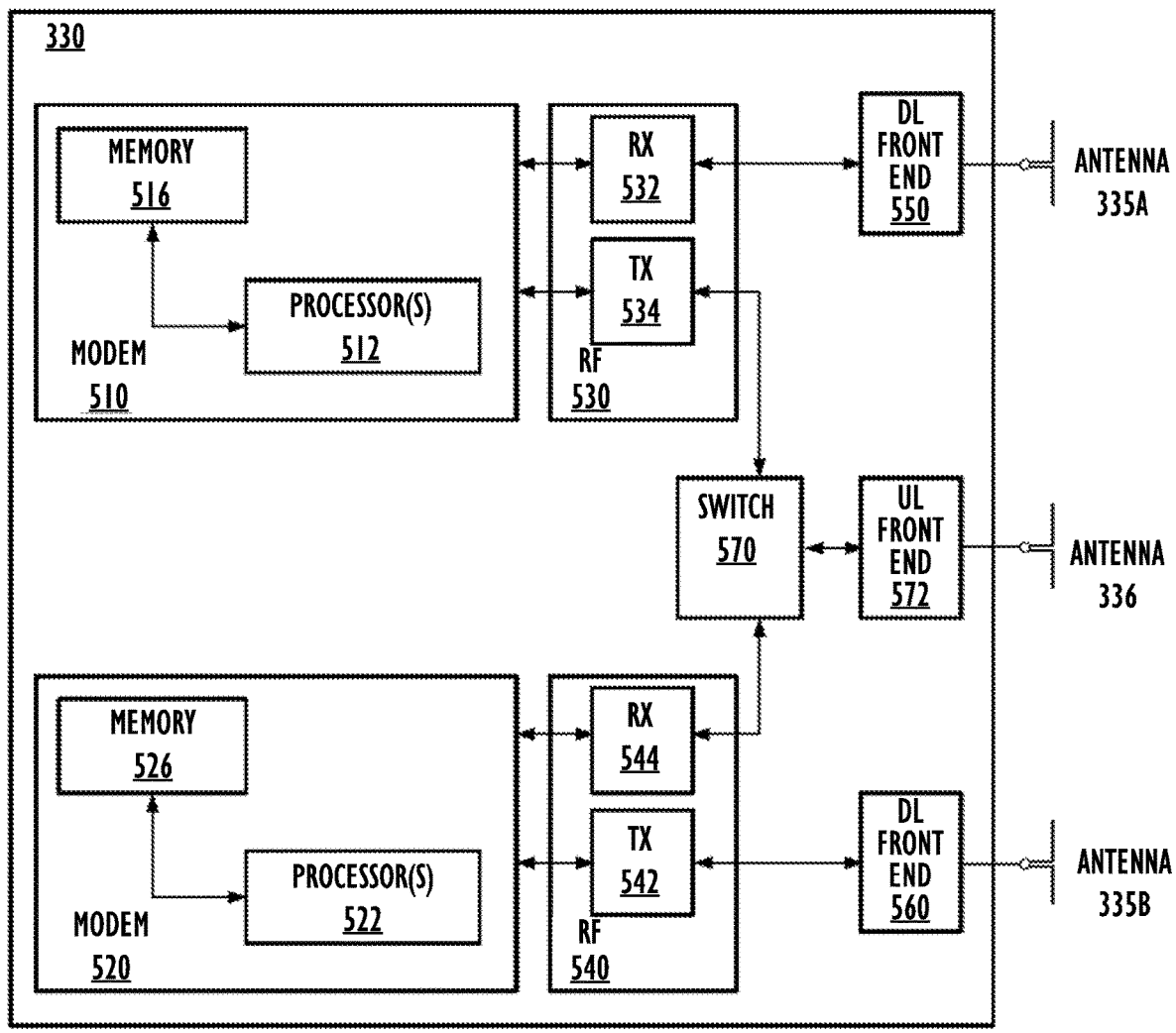
FIG. 5 illustrates an example block diagram of cellular communication circuitry, according to some aspects.

FIG. 5 illustrates an example simplified block diagram of cellular communication circuitry, according to some aspects. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, or circuits including or coupled to fewer antennas, e.g., that may be shared among multiple RATs, are also possible. According to some aspects, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335a-b and 336 as shown. In some aspects, cellular communication circuitry 330 may include dedicated receive chains (including and/or coupled to (e.g., communicatively; directly or indirectly) dedicated processors and/or radios) for multiple RATs (e.g., a first receive chain for LTE and a second receive chain for 5G NR). For example, as shown in FIG. 5, cellular communication circuitry 330 may include a first modem 510 and a second modem 520. The first modem 510 may be configured for communications according to a first RAT, e.g., such as LTE or LTE-A, and the second modem 520 may be configured for communications according to a second RAT, e.g., such as 5G NR.

As shown, the first modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some aspects, receive circuitry 532 may be in communication with downlink (DL) front end 550, which may include circuitry for receiving radio signals via antenna 335a.

Similarly, the second modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some aspects, receive circuitry 542 may be in communication with DL front end 560, which may include circuitry for receiving radio signals via antenna 335b.

In some aspects, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via the first modem 510), switch 570 may be switched to a first state that allows the first modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via the second modem 520), switch 570 may be switched to a second state that allows the second modem 520 to transmit signals according to the second RAT (e.g., via a transmit chain that includes transmit circuitry 544 and UL front end 572).

As described herein, the first modem 510 and/or the second modem 520 may include hardware and software components for implementing any of the various features and techniques described herein. The processors 512, 522 may be configured to implement part or all of the features described herein, e.g., by executing program instructions stored on a memory medium (e.g., a non-transitory computer-readable memory medium). Alternatively (or in addition), processors 512, 522 may be configured as a programmable hardware element, such as an FPGA (Field Programmable Gate Array), or as an ASIC (Application Specific Integrated Circuit). Alternatively (or in addition) the processors 512, 522, in conjunction with one or more of the other components 530, 532, 534, 540, 542, 544, 550, 570, 572, 335 and 336 may be configured to implement part or all of the features described herein.

In addition, as described herein, processors 512, 522 may include one or more processing elements. Thus, processors 512, 522 may include one or more integrated circuits (ICs) that are configured to perform the functions of processors 512, 522. In addition, each integrated circuit may include circuitry (e.g., first circuitry, second circuitry, etc.) configured to perform the functions of processors 512, 522.

In some aspects, the cellular communication circuitry 330 may include only one transmit/receive chain. For example, the cellular communication circuitry 330 may not include the modem 520, the RF front end 540, the DL front end 560, and/or the antenna 335b. As another example, the cellular communication circuitry 330 may not include the modem 510, the RF front end 530, the DL front end 550, and/or the antenna 335a. In some aspects, the cellular communication circuitry 330 may also not include the switch 570, and the RF front end 530 or the RF front end 540 may be in communication, e.g., directly, with the UL front end 572.

Sidelink Communications

In a sidelink scenario, the wireless device is communicating directly with other wireless devices without communications having to be routed through a wireless node. Sidelinks (e.g., via the PC5 interface) are the logical direct interface between wireless devices. For sidelink connections between wireless devices, according to some implementations, a dedicated sidelink resource pool may be determined for wireless devices. The sidelink resource pool may include a set of resources, such as frequencies, subframes, slots, radio blocks, etc., for shared use by wireless devices for sidelink communications between the wireless devices. The sidelink resource pool may be configured and wireless devices may have multiple modes by which to obtain sidelink resources from the sidelink resources pool. For example, two sidelink modes may be defined in some cases. In the first sidelink mode, a wireless network may allocate sidelink resources from the sidelink resources pool to the wireless device. The wireless device may obtain sidelink resource information from the wireless network, for example, via a message such as a DCI format 3_0 message from a wireless node. In the second sidelink mode, a transmitting wireless device may sense a physical medium, such as a set of radio frequencies from a sidelink resources pool, to determine a set of unused frequency resources, and select from the set of unused frequency resources, the sidelink resource. In the second sidelink mode, the sidelink resources pool may be predefined, for example, by a standard and/or manufacturer, and may be based on a location, country, time, etc. A set of rules may be defined for how the frequency resources may be selected and the frequency resources may vary based on a location of the wireless device. In the second sidelink mode, one or more of the wireless devices may be either connected, not connected, or outside of a wireless network coverage area.

Sidelink Sensing

A wireless device in sidelink operation may monitor resources of the sidelink resource pool. In some cases, from the reception point of view, a wireless device may monitor all possible resources from the sidelink resource pool. The continual monitoring may not be desirable for power efficiency. In order to reduce the power consumption used to monitor the sidelink resource pool, the UE may selectively monitor resources. As one example, the wireless device may monitor resources of the sidelink resources pool prior to transmitting a message to determine when the wireless device may be able to transmit the message without interfering with another transmission. Other wireless devices may reserve a future transmission resource (e.g., reserve a later slot to transmit on) at various intervals.

Figure 6:
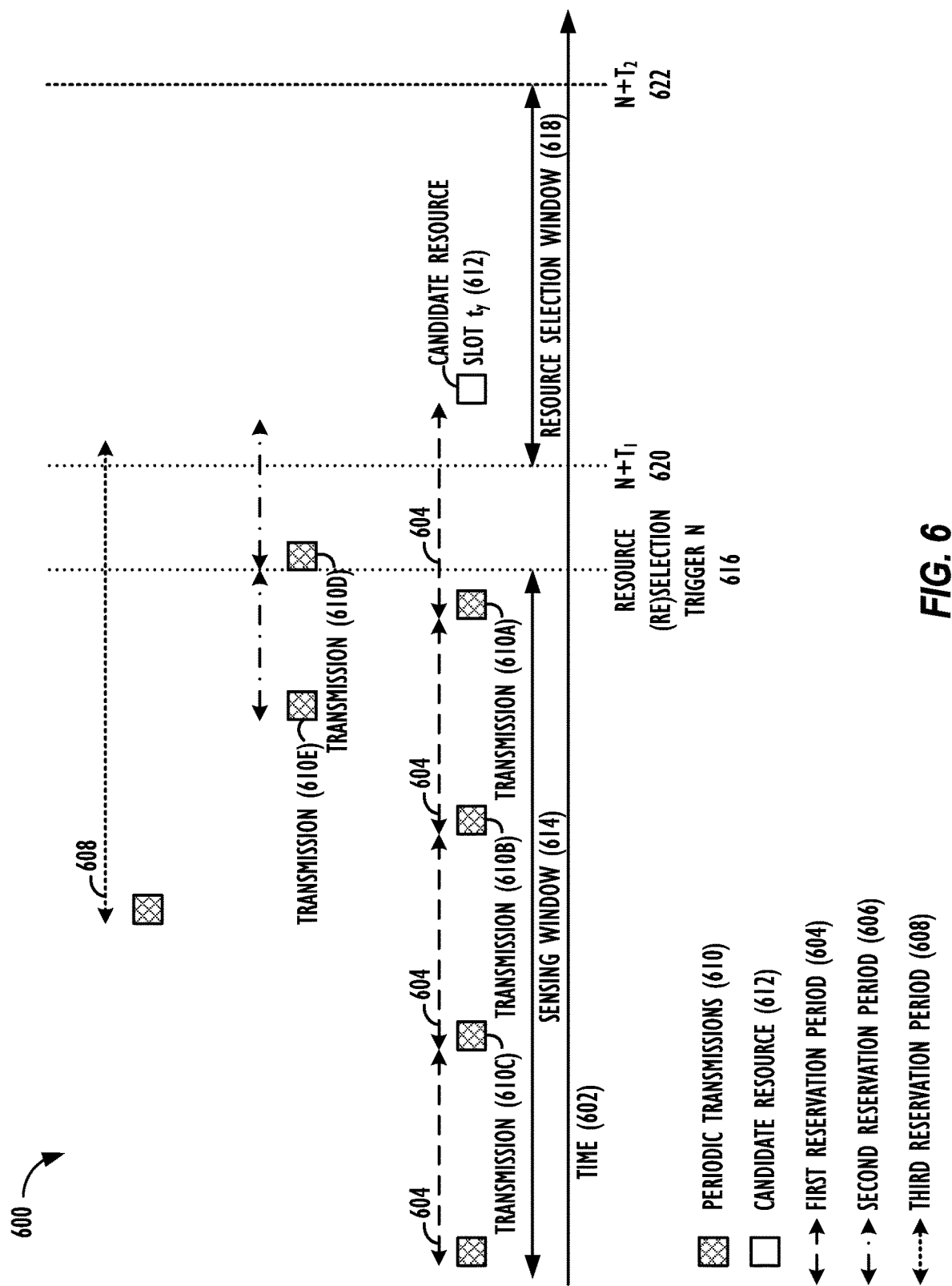
FIG. 6 is a timing diagram illustrating partial sensing, in accordance with aspects of the present disclosure.

FIG. 6 is a timing diagram 600 illustrating partial sensing, in accordance with aspects of the present disclosure. Timing diagram 600 illustrates periodic transmissions plotted on a time axis 602. In some cases, wireless devices operating in a sidelink mode may periodically transmit information. For example, a V2X device may be configured to periodically transmit traffic data at set intervals using resources from the sidelink resources pool. These wireless devices may be configured to periodically transmit based on a reservation period, which is a defined time interval between certain transmissions. In some cases, transmissions may be configured with a periodicity of any integer value between 1 and 99 ms and between 100 ms and 1000 ms in 100 ms intervals.

This example illustrates three reservation periods, a first reservation period 604, a second reservation period 606, and a third reservation period 608 and periodic transmissions 610 may be set by another wireless device during these reservation periods. The first reservation period 604 may have a periodicity of length ($P_{reserve\ 1}$), the second reservation period 606 may have a periodicity of length ($P_{reserve\ 2}$), and the third reservation period 608 may have a periodicity of length ($P_{reserve\ 3}$). In some cases, the periodic transmissions may be new data transmissions and retransmissions of the data may occur within a particular reservation period (not shown). In some cases, the periodic transmissions 610 may include an indication of the corresponding reservation period.

A wireless device may be configured to sense the wireless medium for these periodic transmissions rather than attempting to continuously sensing the medium to help conserve power. The wireless device may perform periodic partial sensing to detect resource reservations for periodic transmissions.

A wireless device may perform periodic partial sensing when periodic reservations for a transport block (TB) are enabled for a sidelink resources pool, when the sidelink resources pool is configured, or preconfigured (e.g., via firmware or coded into the software), to enable partial sensing, and when partial sensing is configured by a higher layer of the wireless device.

A wireless device in sidelink operations may perform periodic partial sensing to determine when the wireless device may perform a sidelink transmission. The wireless device may determine a set of candidate resources on which the wireless device may transmit. This set of candidate resources may include one or more slots on which the wireless device may transmit. A slot 612 at time $t_y$ may be included as a candidate slot in the candidate resource set if the wireless device is configured to monitor slots at $t_{y-k \cdot (P_{reserve})}$ corresponding to the slot, where $P_{reserve}$ is a reservation period and k corresponds to a number of reservation periods prior to the candidate resource in which sensing may be performed (e.g., sensing occasion). For example, another wireless device may periodically transmit periodic transmissions 610A, 610B, and 610C based on the first reservation period 604. If a candidate slot 612 is at time $t_y$, then if a first wireless device were configured to sense within one sensing occasion (k=1) then the first wireless device would sense periodic transmission 610A, which occurs at time $t_{y-1(P_{reserve\_1})}$, one reservation period prior to time $t_y$. Similarly, if first the wireless device were configured to sense within two sensing occasion (k=2) then the first wireless device would sense periodic transmission 610B, which occurs at time $t_{y-2(P_{reserve\_1})}$, two reservation periods prior to time $t_y$, and periodic transmission 610A. Similarly if first the wireless device were configured to sense within three sensing occasion (k=3) then the first wireless device would sense periodic transmission 610C, which occurs at time $t_{y-3(P_{reserve\_1})}$, three reservation periods prior to time $t_y$, as well as periodic transmissions 610B and 610A.

In some cases, the value of k may be limited, for example, to reduce the number of sensing occasions for the wireless device, for example to reduce power consumption. In some cases, k may be preconfigured, for example, in a firmware and/or software of a wireless device. In other cases, k may be configured based on a configuration of a sidelink connection, for example, by the sidelink resources pool. This preconfigured k value may vary, for example, on a given reservation period or based on a sidelink resources pool being used by the wireless devices. For example, a maximum k value ($k_{max}$) may be set as a function of a given resource reservation period. As an example of this function, $k_{max}$ may be a product of the resource reservation period ($P_{reserve}$) which is less than (or equal to) a threshold value for the reservation period, such that $k_{max} * P_{reserve} \leq$ threshold value. As $k_{max}$ may be a function of a resource reservation period, different $P_{reserve}$ may be associated with different $k_{max}$ values.

In some cases, it may be useful to limit the number of time periods for sensing periodic transmissions. In some cases, a wireless device may be preconfigured with a set of supported reservation periods. In some cases, the wireless device may be configured by a sidelink resources pool where the sidelink resources pool may have a set number of reservation periods. For example, a sidelink resources pool may include 16 different reservation periods. In some cases, the wireless device may be configured with multiple sets of reservation periods. For example, the wireless device may be preconfigured (or configured) with two sets of reservation periods. The different sets of reservation periods may each include a different number of reservation periods. For example, one set of reservation periods may include more reservation periods than a second set of reservation periods. In some cases, one set of reservation periods may include all of the reservation periods of the sidelink resources pool (e.g., the set of sl-ResourceReservePeriodList) while a second set of reservation periods may include less than all of the reservation periods of the sidelink resources pool. Having multiple sets of reservation periods may allow a wireless device to balance sensing results and power consumption.

In some cases, the wireless device may be configured to switch between multiple sets of reservation periods. For example, the wireless device may be configured with two sets of reservation periods and may switch between the two sets in certain conditions. For example, a wireless device may be configured to switch between multiple sets of reservation periods based on a channel busy ratio. The wireless device determine a channel busy ratio (CBR) for a period of time by listening to channels allocated of the sidelink resources pool to measure an amount of energy on the channels, such as by measuring a received signal strength indication (RSSI) of the channels without attempting to decode received signals. If the CBR is above a certain threshold, the wireless device may utilize a first set of reservation periods with more reservation periods. If the CBR is below the threshold, the wireless device may use the second set of reservation periods with fewer reservation periods than the first set. In some cases, the CBR threshold may be configured (or preconfigured) based on the sidelink resources pool.

As another example, the wireless device may be configured to switch between multiple sets of reservation periods based on a periodicity of the data to be transmitted. For example, if the wireless device is transmitting aperiodic data, or data with a periodicity larger than a threshold period, the wireless device may utilize the second set of reservation periods with fewer reservation periods than the first set. If the wireless device is transmitting data with a periodicity smaller than the threshold period, then the wireless device may utilize a first set of reservation periods with more reservation periods.

As another example, the wireless device may be configured to switch between multiple sets of reservation periods based on whether the wireless device is configured to perform contiguous partial sensing. Contiguous partial sensing attempts to detect resource reservations by another sidelink wireless device for transmitting aperiodic data (e.g., one shot data) by detecting a sidelink control information (SCI) information in an initial transmission of the data. Based on the SCI information, the wireless device is able to determine the resources reserved for transmitting the aperiodic data and retransmissions. If contiguous partial sensing is applied, then the second set of reservation periods with fewer reservation periods than the first set may be used by the wireless device. The second set of reservation periods may be used as additional sensing may be performed based on the contiguous partial sensing. If contiguous partial sensing is not configured, then the wireless device may utilize a first set of reservation periods with more reservation periods.

As another example, the wireless device may be configured to switch between multiple sets of reservation periods based on a packet delay budget (PDB) for the data to be transmitted. For example, if the data to be transmitted is associated with a larger PDB, then the data can tolerate longer delays and more reliable sensing may be applied. Thus, if the PDB greater than a threshold PDB, the wireless device may utilize a first set of reservation periods with more reservation periods. If the PDB is below the threshold PDB, then the wireless device may use the second set of reservation periods with fewer reservation periods than the first set.

As another example, the wireless device may be configured to switch between multiple sets of reservation periods based on a number of retransmissions for the data to be transmitted. If the number of retransmissions for the data is greater than a threshold number of retransmissions, then the wireless device may utilize a first set of reservation periods with more reservation periods. If number of retransmissions for the data is less than the threshold number of retransmissions, then the wireless device may use the second set of reservation periods with fewer reservation periods than the first set.

As another example, the wireless device may be preconfigured to use the first set of reservation periods or the second set of reservation periods by, for example, a manufacturer of the wireless device.

In some cases, a wireless device may perform sensing during a sensing window 614. If the wireless device receives a resource selection trigger 616 at time n, for example, from an application running on the wireless device indicating that the application has data to transmit via a sidelink transmission, the wireless device may attempt to select candidate resources, such as slot 612 at time $t_y$, within a resource selection window 618 running from time $n+t_1$ 620 to $n+t_2$ 622. In some cases, the wireless device may continue sensing after the resource selection trigger 616 at time n and up to the candidate resource slot, such as slot 612 at time $t_y$, subject to wireless device processing time restrictions. For example, where contiguous partial sensing is configured (not shown), the contiguous partial sensing may occur within a contiguous partial sensing window. This contiguous partial sensing window may be configured to end before the first candidate resource slot, such as slot 612, in the resource selection window 618, subject to wireless device processing time restrictions, and after the resource selection trigger 616. For example, contiguous partial sensing for aperiodic traffic may be performed after the resource selection trigger 616 at time n and before the first candidate resource slot, such as slot 612 at time $t_y$, subject to wireless device processing time restrictions. Thus, if contiguous partial sensing is configured to detect aperiodic traffic within a contiguous partial sensing window that ends before slot 612, the wireless device may sense periodic transmission 610D, which occurs after the resource selection trigger 616 at time n.

In other cases, such as where the wireless device is not configured for contiguous partial sensing, or where contiguous partial sensing is configured but the contiguous partial sensing window ends before the resource selection trigger 616 is received (subject to processing time restrictions of the wireless device), then sensing may be performed before the resource selection trigger 616 occurs and no additional sensing performed after the resource selection trigger 616. For example, if the wireless device is configured contiguous partial sensing to detect periodic traffic within a contiguous partial sensing window and this contiguous partial sensing window ends at or before the resource selection trigger 616, then the wireless device may sense periodic transmission 610E, but not periodic transmission 610D. As another example, if the wireless device is not configured for contiguous partial sensing, then sensing may be performed up to receipt of the resource selection trigger 616. In some cases, additional periodic partial sensing may be performed when contiguous partial sensing is not applied. For example, the k value may be increased when contiguous partial sensing is not configured as compared to when contiguous partial sensing is configured.

In some cases, contiguous partial sensing may be configured for mode 2 sidelink operations by a wireless device if the resource pool is configured (or preconfigured) to enable contiguous partial sensing and when contiguous partial sensing is configured by a layer higher than the PHY layer.

Resource Determination with Inter-Device Coordination

In some cases, a first wireless device in sidelink operations may provide a set of preferred (or non-preferred) sidelink resources to a second wireless device. The second wireless device may then select a sidelink resource based on the provided set, for example to transmit to the first wireless device (or another wireless device). This process may be referred to as inter-device coordination. In some cases, the first wireless device may also determine the set of preferred (or non-preferred) sidelink resources based on sensing performed by the first wireless device. In some cases, the first wireless device may also receive a set of preferred (or non-preferred) sidelink resources received from a third wireless device and determine the set of preferred (or non-preferred) sidelink resources based on the received set as well was sensing performed by the first wireless device.

Figure 7:
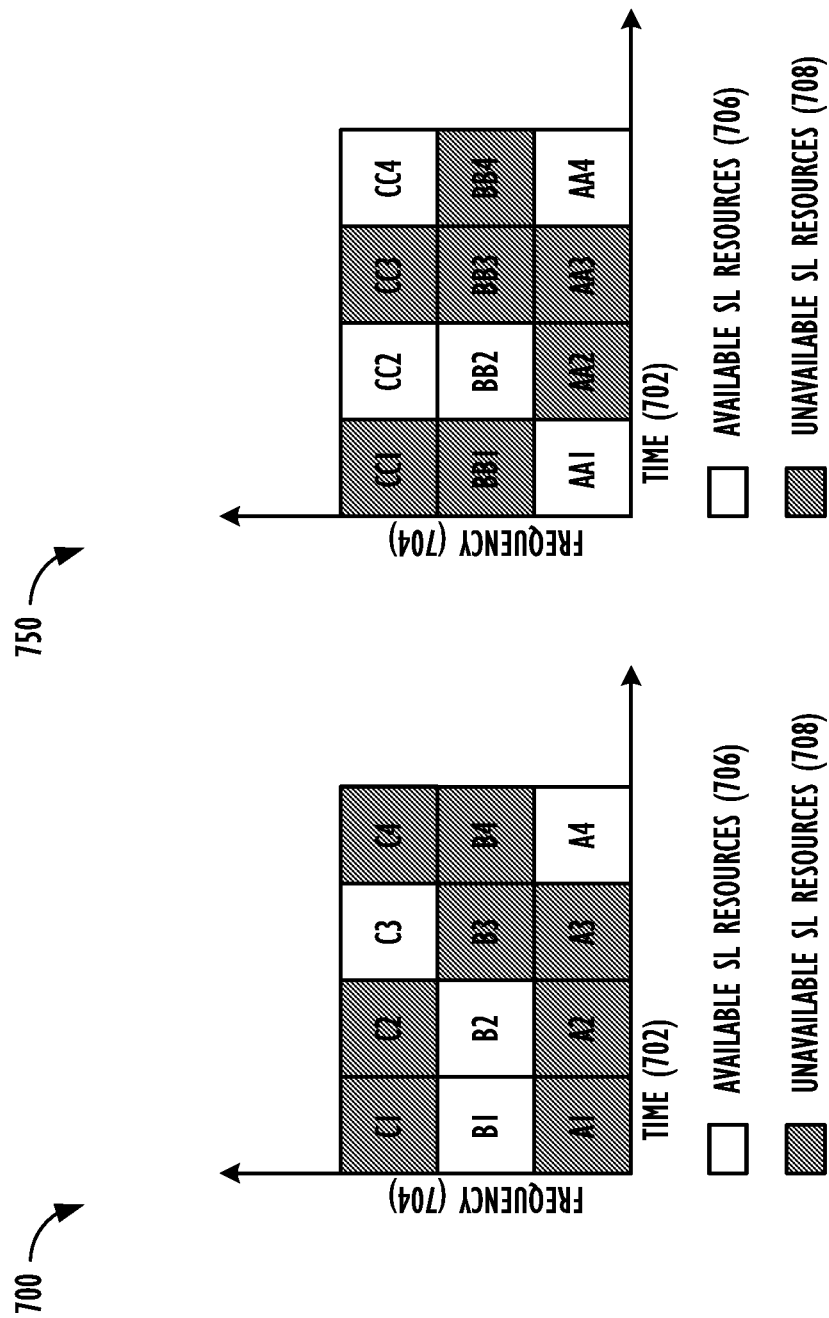
FIGS. 7A and 7B are resource diagrams of a sidelink resources pool, in accordance with aspects of the present disclosure.

FIGS. 7A and 7B are resource diagrams 700 and 750 of a sidelink resources pool, in accordance with aspects of the present disclosure. The diagrams 700 of FIG. 7A and 750 of FIG. 7B illustrate simplified sets of resources of a sidelink resources pool with resources oriented on a time axis 702 and frequency axis 704 for clarity. In some cases, a first wireless device may identify, based on sensing performed by the first wireless device, a set of preferred sidelink resources (e.g., slots, subframes, etc.) that a second wireless device may use to transmit a message to the first wireless device. In the example shown in diagram 700 of FIG. 7A, the first wireless device may sense the sidelink resources pool and identify available sidelink resources 706 C3, B1, B2, and A4 as preferred sidelink resources and transmit an indication of these preferred sidelink resources to the second wireless device. This indication may be a set of preferred sidelink resources ($S_p$) of the first wireless device ($UE1(S_p)$). In some cases, the first wireless device may sense the sidelink resources pool and identify non available sidelink resources 708 C1, C2, C4, B3, B4, A1, A2, and A3 as non-preferred resources and transmit an indication of these non-preferred sidelink resources to the second wireless device. This indication may be a set of non-preferred sidelink resources ($S_{np}$) of the first wireless device ($UE1(S_{np})$).

In the example shown in diagram 750 of FIG. 7B, the third wireless device may be located separately from the first wireless device and sense the sidelink resources pool to identify available sidelink resources 706 CC2, CC4, BB2, AA1, and AA4 as preferred sidelink resources. The third wireless device may transmit a set of preferred sidelink resources of the third wireless device ($UE3(S_p)$) to another wireless device, such as the first wireless device. In some cases, the third wireless device may sense the sidelink resources pool and identify non available sidelink resources 708 CC1, CC3, BB1, BB3, BB4, AA2, and AA3 as non-preferred sidelink resources. The third wireless device may transmit a set of non-preferred sidelink resources of the third wireless device ($UE3(S_{np})$) to another wireless device, such as the first wireless device.

In some cases, the first wireless device may receive inter-device coordination information from the third wireless device. This inter-device coordination information may be based on sensing performed by the third wireless device and/or may include information received from another wireless device by the third wireless device. The first wireless device may identify the set of preferred or non-preferred sidelink resources for the second wireless device based on the received inter-device coordination information from the third wireless device.

To identify a set of resources for the second wireless device, the first wireless device may first identify a set of preferred ($UE1(S_p)$) or non-preferred ($UE1(S_{np})$) resources based on sensing performed by the first wireless device. Where the first wireless device receives, from the third wireless device, a set of preferred ($UE3(S_p)$) or non-preferred ($UE3(S_{np})$) sidelink resources, the first wireless device may combine the sets of preferred/non-preferred sidelink resources prior to transmitting the combined set to the second wireless device. For example, where the first wireless device determines a combined set of preferred ($C(S_p)$) sidelink resources and receives from the third wireless device a set of preferred ($UE3(S_p)$) sidelink resources, the combined set ($C(S_p)$) may be the intersection of sets ($UE1(S_p)$) and ($UE3(S_p)$). In some cases, the combined set of preferred ($C(S_p)$) may be used by the first wireless device for a transmitting and another set of preferred (or non-preferred) resources, excluding any resources used by the first wireless device, may be determined and transmitted via an inter-device coordination message to the second wireless device. In other cases, the combined set of preferred ($C(S_p)$) may be transmitted to the second wireless device via an inter-device coordination message for use by the second wireless device.

As another example, where the first wireless device determines a combined set of preferred ($C(S_p)$) sidelink resources and receives from the third wireless device a set of non-preferred ($UE3(S_{np})$) sidelink resources, the combined set ($C(S_p)$) may be set ($UE1(S_p)$) excluding set ($UE3(S_{np})$). In some cases, the combined set of preferred ($C(S_p)$) may be used by the first wireless device for a transmitting and another set of preferred (or non-preferred) resources, excluding any resources used by the first wireless device, may be determined and transmitted via an inter-device coordination message to the second wireless device. In other cases, the combined set of preferred ($C(S_p)$) may be transmitted to the second wireless device via an inter-device coordination message for use by the second wireless device.

As another example, where the first wireless device determines a combined set of non-preferred ($C(S_{np})$) sidelink resources and receives from the third wireless device a set of non-preferred ($UE3(S_{np})$) sidelink resources, the combined set ($C(S_{np})$) may be a union of sets ($UE1(S_{np})$) and set ($UE3(S_{np})$). In some cases, the combined set of preferred ($C(S_{np})$) may be used by the first wireless device for a transmitting and another set of preferred (or non-preferred) resources, excluding any resources used by the first wireless device, may be determined and transmitted via an inter-device coordination message to the second wireless device. In other cases, the combined set of preferred ($C(S_{np})$) may be transmitted to the second wireless device via an inter-device coordination message for use by the second wireless device.

As another example, where the first wireless device determines a combined set of non-preferred ($C(S_{np})$) sidelink resources and sends to the third wireless device a set of preferred ($UE3(S_p)$) sidelink resources, the combined set ($C(S_{np})$) may be a union of sets ($UE1(S_{np})$) and set ($UE3(S_p)$). In some cases, the combined set of non-preferred ($C(S_{np})$) may be used by the first wireless device for a transmitting and another set of preferred (or non-preferred) resources, excluding any resources used by the first wireless device, may be determined and transmitted via an inter-device coordination message to the second wireless device. In other cases, the combined set of preferred ($C(S_{np})$) may be transmitted to the second wireless device via an inter-device coordination message for use by the second wireless device.

In some cases, after determining the combined set of preferred ($C(S_p)$) or non-preferred ($C(S_{np})$) sidelink resources, the first wireless device may transmit the combined set to the third wireless device in an inter-device coordination message. As an example, where the first wireless device determines a combined set of preferred ($C(S_p)$) sidelink resources for the third wireless device and sends to the third wireless device a set of preferred ($UE3(S_p)$) sidelink resources, the combined set ($C(S_p)$) may be set ($UE1(S_p)$) excluding set ($UE3(S_p)$). This combined set ($C(S_p)$) may be sent to the third wireless device indicating the resources preferred for use by a transmission by the third wireless device.

As another example, where the first wireless device determines a combined set of non-preferred ($C(S_{np})$) sidelink resources for the third wireless device and sends to the third wireless device a set of non-preferred ($UE3(S_{np})$) sidelink resources, the combined set ($C(S_{np})$) may be set ($UE1(S_p)$) excluding set ($UE3(S_{np})$). This combined set ($C(S_{np})$) may be sent to the third wireless device indicating the resources not preferred for use by a transmission by the third wireless device.

Figure 8:
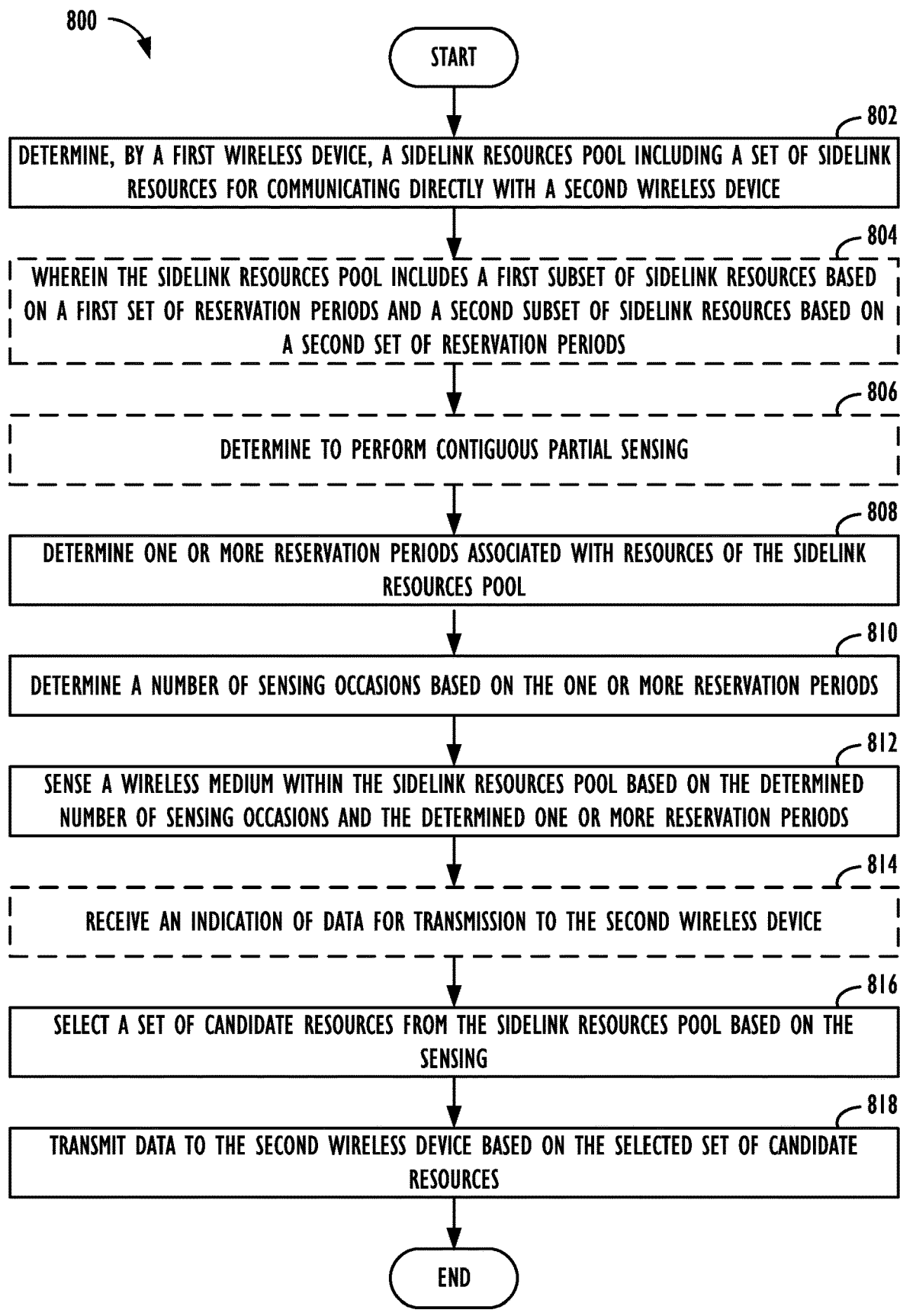
FIG. 8 is a flow diagram illustrating a technique for wireless sidelink communications, in accordance with aspects of the present disclosure.

FIG. 8 is a flow diagram 800 illustrating a technique for wireless sidelink communications, in accordance with aspects of the present disclosure. At block 802, a first wireless device determines a sidelink resources pool including a set of sidelink resources for communicating directly with a second wireless device. For example, a wireless device may be preconfigured with one or more sidelink resources pools by a manufacturer. As another example, a wireless device may receive the sidelink resources pool information from a wireless node or determine the sidelink resources pool information by sampling a wireless medium.

Optionally, at block 804, the sidelink resources pool may include a first subset of sidelink resources based on a first set of reservation periods and a second subset of sidelink resources based on a second set of reservation periods, where the first subset of sidelink resources and the second subset of sidelink resources indicate sets of sensing occasions, and where the first subset of sidelink resources includes more sidelink resources than the second subset of sidelink resources. For example, the wireless device may be configured (or preconfigured) with multiple sets of sidelink resource reservation periods. Different sets of sidelink resource reservation periods may include a different number of sidelink resource reservation periods. In some cases, the first subset of resource reservation periods may comprise all resource reservation periods configured in the sidelink resources pool and the second subset of sidelink resources may comprise less than all of the resource reservation periods configured in the sidelink resources pool. For example, one set of sidelink resource reservation periods may include more sidelink reservation periods than another set of sidelink resource reservation periods. In some cases, one set of sidelink resource reservation periods may include all of the sidelink resources configured for a sidelink resources pool.

Optionally at block 806, the wireless device may determine to perform contiguous partial sensing. For example, the wireless device may be configured (or preconfigured) to perform contiguous partial sensing to attempt to detect resource reservation transmissions for aperiodic data.

At block 808, one or more reservation periods associated with resources of the sidelink resources pool is determined. For example, the sidelink resources pool may include one or more reservation periods and these reservation periods. In some cases, the multiple sets of sidelink reservation periods may be defined and the wireless device may select among the sets of sidelink reservations periods for a set of sidelink reservation periods to monitor. At block 810, a number of sensing occasions is determined based on the one or more reservation periods. For example, a maximum k value may be determined. In some cases, determining the number of sensing occasions is also based on a maximum sensing threshold number. For example, k value may be defined such that $k_{max} * P_{reserve} <=$ threshold value. In some cases, the k value may be defined per reservation period. In some cases, the maximum sensing threshold number is predetermined based on the sidelink resources pool. In some cases, the maximum sensing threshold may be less than or equal to the configured sensing window size for full sensing.

At block 812, a wireless medium is sensed within the sidelink resources pool based on the determined number of sensing occasions and the determined one or more reservation periods. For example, the wireless device may sense the transmission occasions corresponding to selected reservation periods of the sidelink resources pool and within the determined k value. Optionally at block 814, an indication of data for transmission to the second wireless device may be received. For example, an application executing on the first wireless device may trigger resource selection. At block 816, a set of candidate resources is selected from the sidelink resources pool based on the sensing. For example, the wireless device may sense based on the selected sidelink reservation periods to listen for and attempt to decode transmissions to determine if there are scheduled periodic transmissions during a candidate resource slot. If the wireless device determines that there are no other schedule periodic transmissions during the candidate resource slot, the wireless device may select that candidate resource slot to transmit. In some cases, the candidate resource slot may be selected for a periodic transmission. At block 818, the data is transmitted to the second wireless device based on the selected set of candidate resources.

Figure 9:
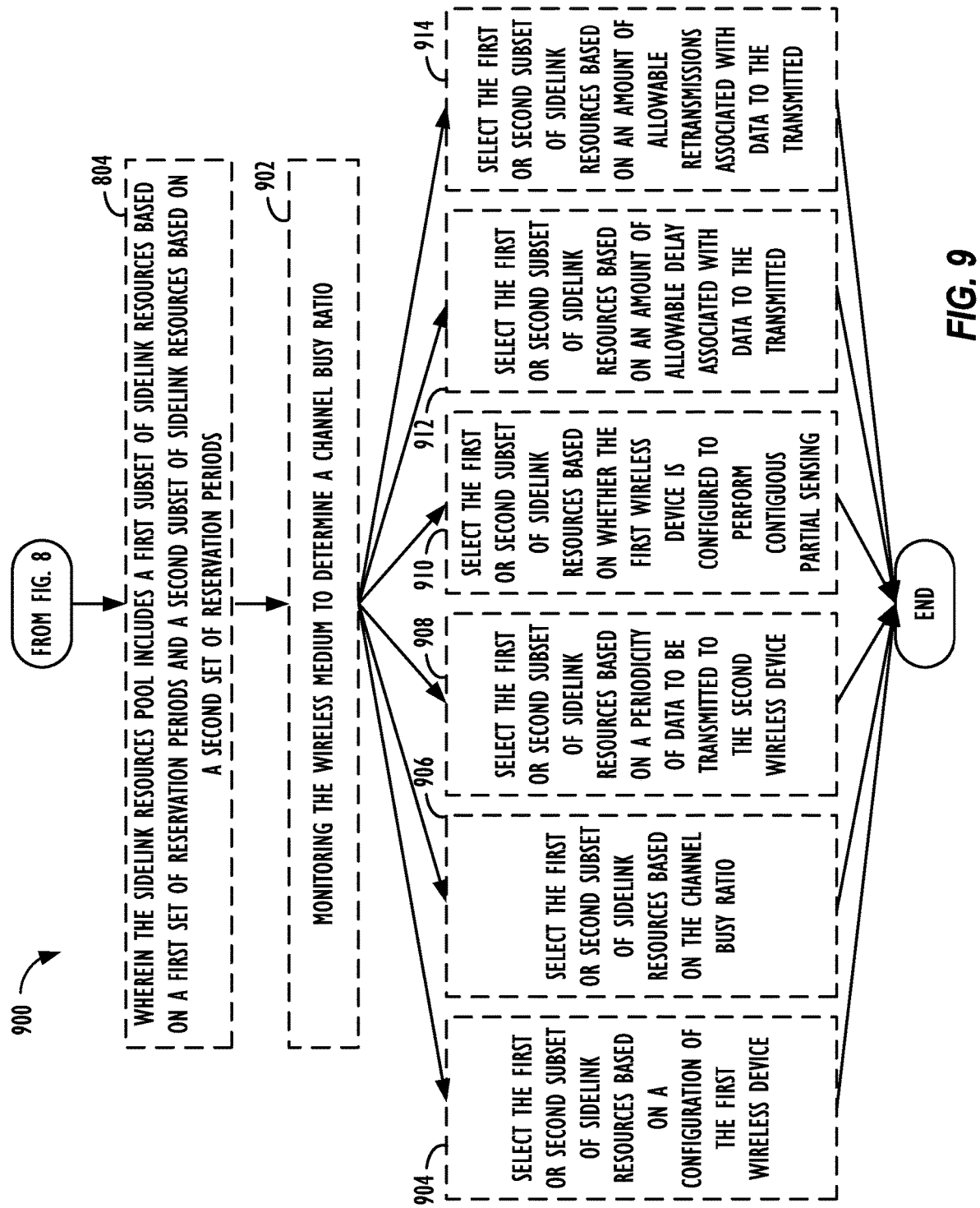
FIG. 9 is a flow diagram illustrating optional aspects of a technique for wireless sidelink communications, in accordance with aspects of the present disclosure.

FIG. 9 is a flow diagram 900 illustrating optional aspects of a technique for wireless sidelink communications, in accordance with aspects of the present disclosure. Flow diagram 900 extends the flow diagram 800 of FIG. 8 and illustrates optional aspects of the present disclosure. At block 804, the sidelink resources pool may include a first subset of sidelink resources based on a first set of reservation periods and a second subset of sidelink resources based on a second set of reservation periods, where the first subset of sidelink resources and the second subset of sidelink resources indicate sets of sensing occasions, and where the first subset of sidelink resources includes more sidelink resources than the second subset of sidelink resources. Optionally at block 902, the wireless medium may be monitored to determine a channel busy ratio (CBR). In some cases, this monitoring may measure an amount of energy on the channels of the sidelink resources pool without attempting to decode received messages. For example, a measurement of a RSSI may be made on different channels to determine a ratio of busy channels and not busy channels based on a threshold RSSI. Optionally, at block 904, a selection may be made between the first subset of sidelink resources or the second subset of sidelink resources based on a configuration of the first wireless device, and wherein the sensing is based on the selected subset of sidelink resources. For example, the wireless device may be preconfigured, for example by a manufacturer, to select from among multiple sets of sidelink resource reservation periods. Optionally, at block 906, a selection may be made between the first subset of sidelink resources or the second subset of sidelink resources based on the CBR, and wherein the sensing is based on the selected subset of sidelink resources. For example, if the CBR is above a certain threshold, the wireless device may utilize a first set of sidelink reservation periods, if the CBR is below the certain threshold, the device may utilize a second set of sidelink reservation periods.

Optionally, at block 908, a selection may be made between the first subset of sidelink resources or the second subset of sidelink resources based on a periodicity of data to be transmitted to the second wireless device, and wherein the sensing is based on the selected subset of sidelink resources. For example, if the wireless device is transmitting aperiodic data, or data with a periodicity larger than a threshold period, the wireless device may utilize one set of sidelink reservation periods and if the wireless device is transmitted data with a periodicity less than the threshold period, the wireless device may utilize another set of sidelink reservation periods. Optionally at block 910, a selection may be made between the first subset of sidelink resources or the second subset of sidelink resources based on whether the first wireless device is configured to perform contiguous partial sensing, and wherein the sensing is based on the selected subset of sidelink resources. For example, if contiguous partial sensing is applied, then the wireless device may utilize one set of sidelink reservation periods and if the wireless device is not configured to perform contiguous partial sensing then the wireless device may utilize another set of sidelink reservation periods. Optionally at block 912, a selection may be made between the first subset of sidelink resources or the second subset of sidelink resources based on an amount of allowable delay associated with data to the transmitted, and wherein the sensing is based on the selected subset of sidelink resources. For example, if the data to be transmitted is associated with a PDB larger than a PDB threshold, then the wireless device may utilize one set of sidelink reservation periods, otherwise the wireless device may utilize another set of sidelink reservation periods. Optionally at block 914, a selection may be made between the first subset of sidelink resources or the second subset of sidelink resources based on an amount of allowable retransmissions associated with data to the transmitted, and wherein the sensing is based on the selected subset of sidelink resources. For example, if the number of retransmissions for the data is greater than a threshold number of retransmissions, then then the wireless device may utilize one set of sidelink reservation periods, otherwise the wireless device may utilize another set of sidelink reservation periods.

Figure 10:
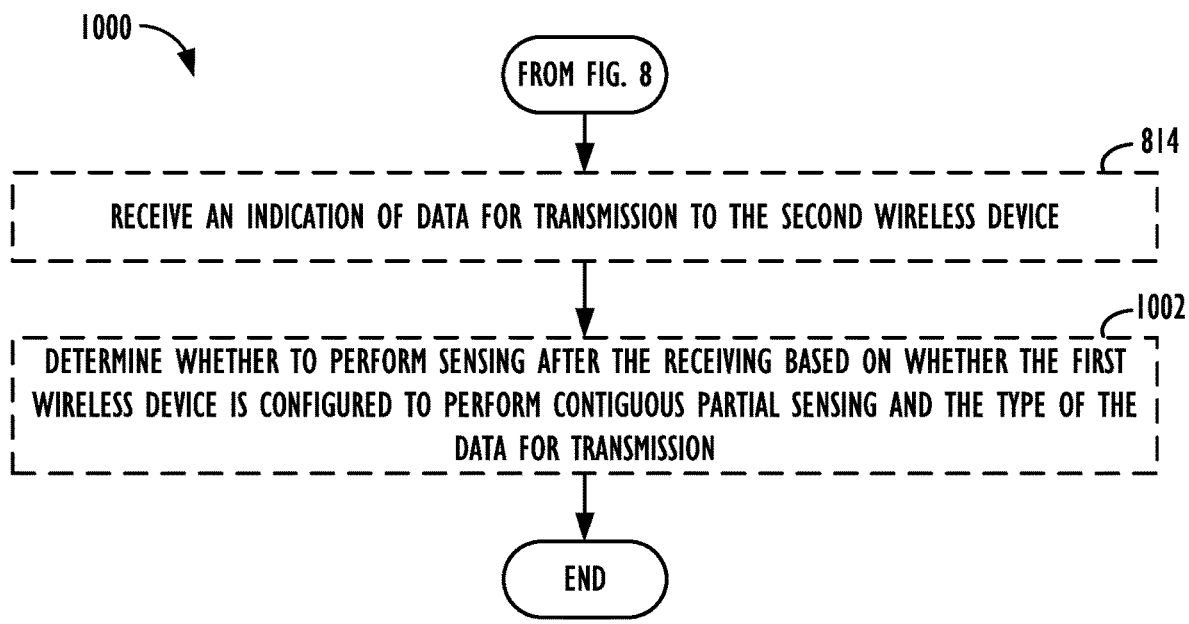
FIG. 10 is a flow diagram illustrating optional aspects of a technique for wireless sidelink communications, in accordance with aspects of the present disclosure.

FIG. 10 is a flow diagram 1000 illustrating optional aspects of a technique for wireless sidelink communications, in accordance with aspects of the present disclosure. Flow diagram 1000 extends the flow diagram 800 of FIG. 8 and illustrates optional aspects of the present disclosure. At block 814, an indication of data for transmission to the second wireless device may be received. At block 1002, a determination may be made to perform contiguous partial sensing based on a configuration associated with the sidelink resources pool and a received indication to perform contiguous partial sensing. For example, where the wireless device is configured to perform contiguous partial sensing for aperiodic transmissions, the wireless device may perform sensing between the resource selection trigger and a first candidate resource slot.

Figure 11:
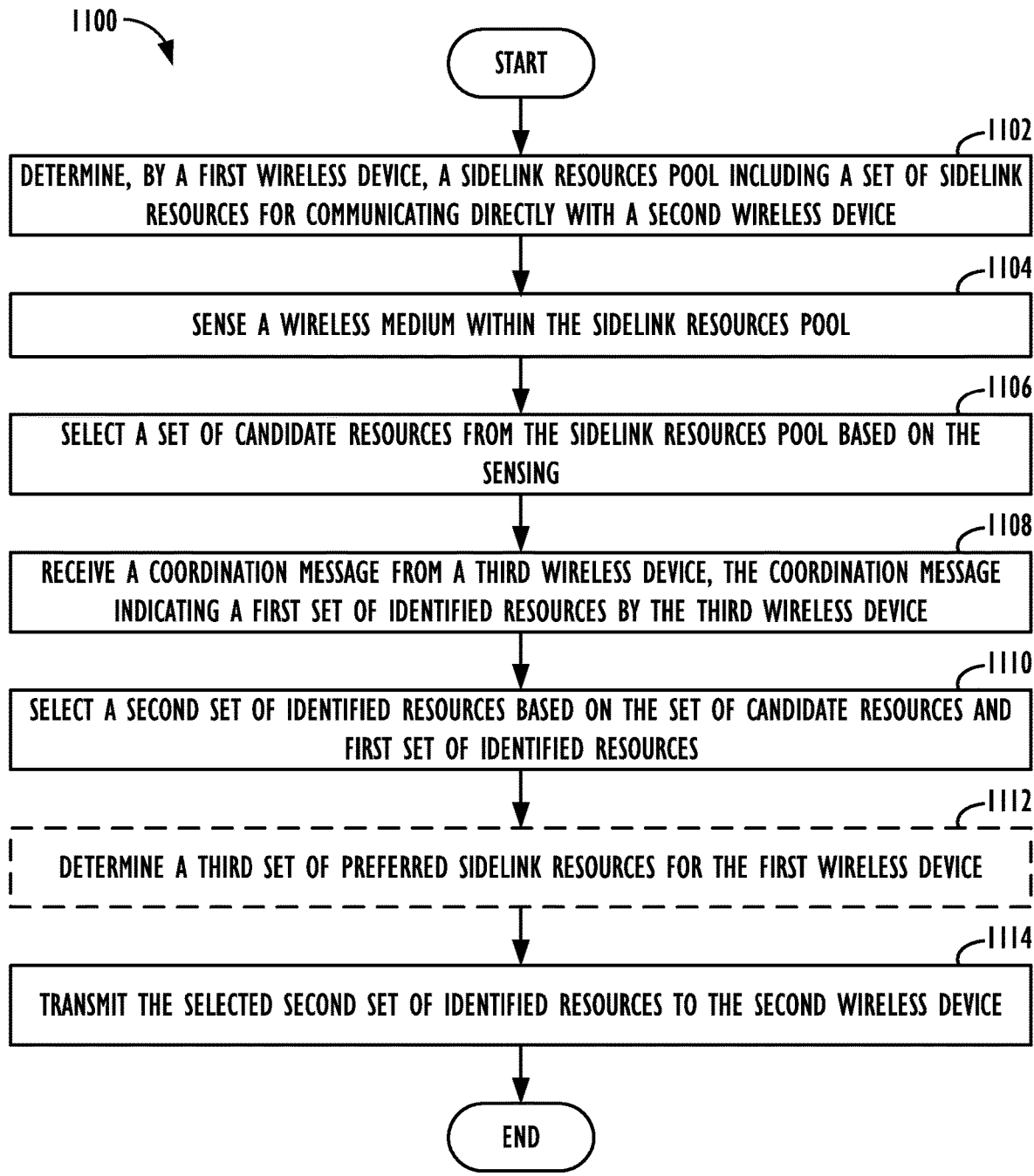
FIG. 11 is a flow diagram illustrating a technique for wireless sidelink communications, in accordance with aspects of the present disclosure.

FIG. 11 is a flow diagram 1100 illustrating a technique for wireless sidelink communications, in accordance with aspects of the present disclosure. At block 1102, a first wireless device may determine a sidelink resources pool including a set of sidelink resources for communicating directly with a second wireless device. For example, a wireless device may be preconfigured with one or more sidelink resources pools by a manufacturer. As another example, a wireless device may receive the sidelink resources information from a wireless node or determine the sidelink resources information by sampling a wireless medium. The sidelink resources may include information about a set of wireless resources for sidelink communications. At block 1104, a wireless medium within the sidelink resources pool may be sensed. For example, the wireless device may perform sensing on various sidelink resources of the sidelink resources pool to attempt to detect resource reservation transmissions. At block 1106, a set of candidate resources are selected from the sidelink resources pool based on the sensing. For example, resources for which a resource reservation transmission was not received for may be selected as candidate resources. In some cases, the first set of identified resources comprises an indication of preferred sidelink resources for the first wireless device. At block 1108, a coordination message is received from a third wireless device, the coordination message indicating a first set of identified resources by the third wireless device. For example, the wireless device may receive an inter-device coordination message from another wireless device. The inter-device coordination message may indicate a set of preferred (or non-preferred) sidelink resources. At block 1110 a second set of identified resources is selected based on the set of candidate resources and first set of identified resources. For example, the set of candidate resources selected based on the sensing may be merged with a set of preferred (or non-preferred) resources received from the other wireless device. In some cases, selecting the second set is based on an intersection between the set of candidate resources and the first set of identified resources. Optionally, at block 1112, a third set of preferred sidelink resources for the first wireless device may be determined. For example, the wireless device may determine a sidelink resource for use by the wireless device for transmitting a sidelink message based on the merged sets of resources. At block 1114, the selected second set of identified resources is transmitted to the second wireless device. For example, the wireless device can transmit an inter-device coordination message with the second set of identified resources to the second wireless device.

Figure 12:
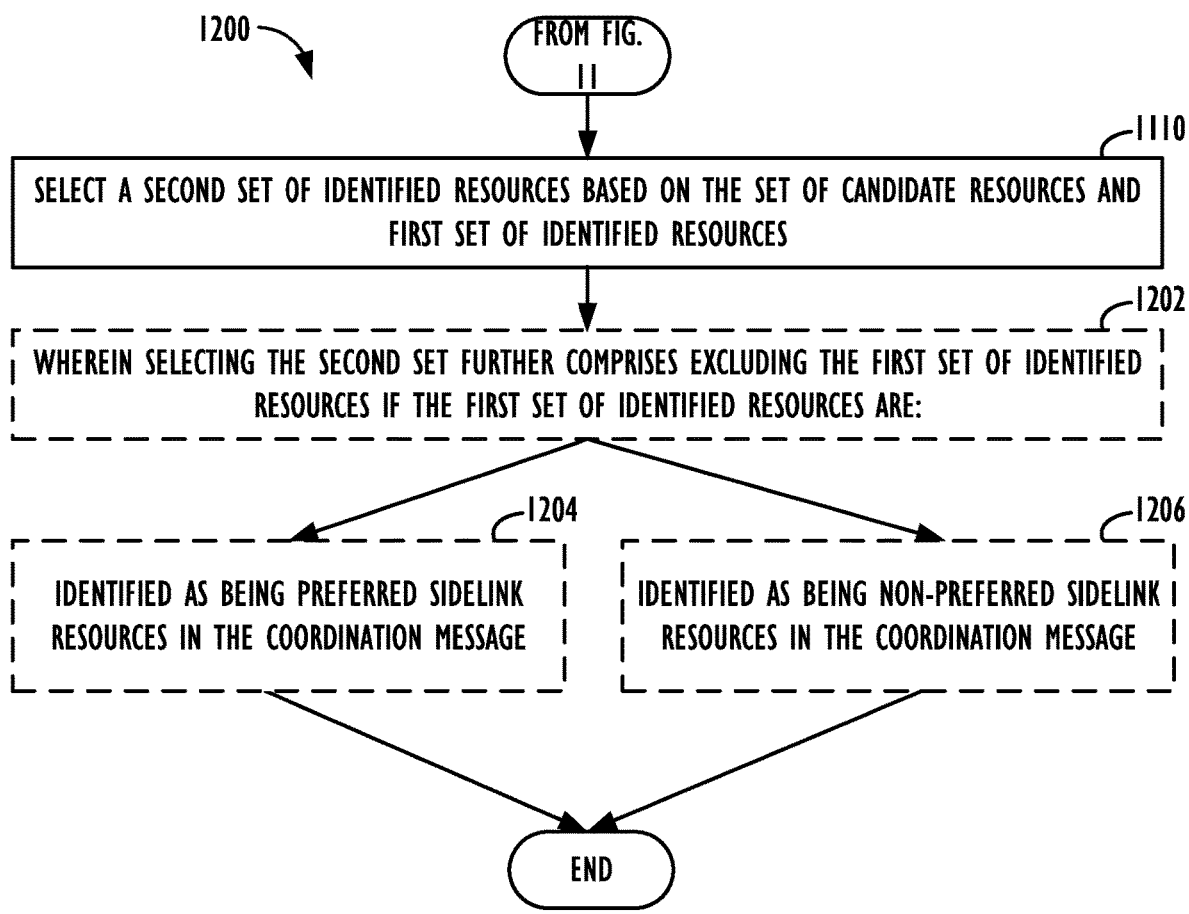
FIG. 12 is a flow diagram illustrating optional aspects of a technique for wireless sidelink communications, in accordance with aspects of the present disclosure.

FIG. 12 is a flow diagram 1200 illustrating optional aspects of a technique for wireless sidelink communications, in accordance with aspects of the present disclosure. Flow diagram 1200 extends the flow diagram 1100 of FIG. 11 and illustrates optional aspects of the present disclosure. At block 1100 a second set of identified resources is selected based on the set of candidate resources and first set of identified resources. In some cases, selecting the second set comprises a union between the first set of identified resources. In some cases, selecting the second set is based on an excluding the first set of identified resources from the set of candidate resources and the determined third set of preferred sidelink resources. At block 1202, in some cases, selecting the second set further comprises excluding the first set of identified resources. At block 1204, selecting the second set further comprises excluding the first set of identified resources if the first set of identified resources are identified as being preferred sidelink resources in the coordination message. At block 1206, selecting the second set further comprises excluding the first set of identified resources if the first set of identified resources are identified as being non-preferred sidelink resources in the coordination message. In some cases, the first set of identified resources comprises an indication of non-preferred sidelink resources for the first wireless device. In some cases, a third set of non-preferred sidelink resources may be determined for the first wireless device and wherein selecting the second set comprises a union between the first set of identified resources and the determined third set of non-preferred sidelink resources.

EXAMPLES

In the following sections, further exemplary aspects are provided.

According to Example 1, a method for power saving by a first wireless device, comprising: determining, by a first wireless device, a sidelink resources pool including a set of sidelink resources for communicating directly with a second wireless device, determining one or more reservation periods associated with resources of the sidelink resources pool, determining a number of sensing occasions based on the one or more reservation periods; sensing a wireless medium within the sidelink resources pool based on the determined number of sensing occasions and the determined one or more reservation periods; selecting a set of candidate resources from the sidelink resources pool based on the sensing; and transmitting data to the second wireless device based on the selected set of candidate resources.

Example 2 comprises the subject matter of example 1, wherein determining the number of sensing occasions is also based on a maximum sensing threshold number.

Example 3 comprises the subject matter of example 2, wherein the maximum sensing threshold number is predetermined based on the sidelink resources pool.

Example 4 comprises the subject matter of examples 1-3, wherein the sidelink resources pool includes a first subset of sidelink resources based on a first set of reservation periods and a second subset of sidelink resources based on a second set of reservation periods, wherein the first subset of sidelink resources and the second subset of sidelink resources indicate sets of sensing occasions, and wherein the first subset of sidelink resources includes more sidelink resources than the second subset of sidelink resources.

Example 5 comprises the subject matter of example 4, wherein the first subset of sidelink resources comprises all resource reservation periods configured in the sidelink resources pool, and wherein the second subset of sidelink resources comprises less than all of the resource reservation periods configured in the sidelink resources pool.

Example 6 comprises the subject matter of examples 4-5 further comprising selecting the first subset of sidelink resources or the second subset of sidelink resources based on a configuration of the first wireless device, and wherein the sensing is based on the selected subset of sidelink resources.

Example 7 comprises the subject matter of examples 4-6, further comprising: monitoring the wireless medium to determine a channel busy ratio; and selecting the first subset of sidelink resources or the second subset of sidelink resources based on the channel busy ratio, and wherein the sensing is based on the selected subset of sidelink resources.

Example 8 comprises the subject matter of examples 4-7, further comprising selecting the first subset of sidelink resources or the second subset of sidelink resources based on a periodicity of data to be transmitted to the second wireless device, and wherein the sensing is based on the selected subset of sidelink resources.

Example 9 comprises the subject matter of examples 4-8, further comprising selecting the first subset of sidelink resources or the second subset of sidelink resources based on whether the first wireless device is configured to perform contiguous partial sensing, and wherein the sensing is based on the selected subset of sidelink resources.

Example 10 comprises the subject matter of examples 4-9, further comprising selecting the first subset of sidelink resources or the second subset of sidelink resources based on an amount of allowable delay associated with data to the transmitted, and wherein the sensing is based on the selected subset of sidelink resources.

Example 11 comprises the subject matter of examples 4-10, further comprising selecting the first subset of sidelink resources or the second subset of sidelink resources based on an amount of allowable retransmissions associated with data to the transmitted, and wherein the sensing is based on the selected subset of sidelink resources.

Example 12 comprises the subject matter of examples 1-11, further comprising receiving an indication of data for transmission to the second wireless device and wherein the sensing is performed before the receiving.

Example 13 comprises the subject matter of examples 1-11, further comprising determining to perform contiguous partial sensing based on a configuration associated with the sidelink resources pool and a received indication to perform contiguous partial sensing.

Example 14 comprises the subject matter of examples 1-11, further comprising: receiving an indication of data for transmission to the second wireless device; and determining whether to perform sensing after the receiving based on whether the first wireless device is configured to perform contiguous partial sensing and the type of the data for transmission.

Example 15 comprises the subject matter of example 14, wherein the first wireless device is configured to perform contiguous partial sensing after receiving the indication of data and before a first candidate resource of the selected set of candidate resources.

According to Example 16, a method for wireless communications comprising: determining, by a first wireless device, a sidelink resources pool including a set of sidelink resources for communicating directly with a second wireless device; sensing a wireless medium within the sidelink resources pool; selecting a set of candidate resources from the sidelink resources pool based on the sensing; receiving a coordination message from a third wireless device, the coordination message indicating a first set of identified resources by the third wireless device; selecting a second set of identified resources based on the set of candidate resources and first set of identified resources; and transmitting the selected second set of identified resources to the second wireless device.

Example 17 comprises the subject matter of example 16, wherein the first set of identified resources comprises an indication of preferred sidelink resources for the first wireless device.

Example 18 comprises the subject matter of example 17, wherein selecting the second set is based on an intersection between the set of candidate resources and the first set of identified resources.

Example 19 comprises the subject matter of example 17, further comprising determining a third set of preferred sidelink resources for the first wireless device and wherein selecting the second set comprises a union between the first set of identified resources and the determined third set of preferred sidelink resources.

Example 20 comprises the subject matter of example 16, wherein the first set of identified resources comprises an indication of non-preferred sidelink resources for the first wireless device.

Example 21 comprises the subject matter of example 20, wherein selecting the second set is based on an excluding the first set of identified resources from the set of candidate resources.

Example 22 comprises the subject matter of example 20, further comprising determining a third set of non-preferred sidelink resources for the first wireless device and wherein selecting the second set comprises a union between the first set of identified resources and the determined third set of non-preferred sidelink resources Example 23 comprises the subject matter of example 16, wherein selecting the second set further comprises excluding the first set of identified resources if the first set of identified resources are: identified as being preferred sidelink resources in the coordination message, or identified as being non-preferred sidelink resources in the coordination message.

Example 24 comprises the subject matter of example 23, further comprising transmitting a coordination message to the third wireless device based on the second set of identified resources.

According to Example 25, a first wireless device comprising: a radio; and a processor operably coupled to the radio, wherein the processor is configured to: determine a sidelink resources pool including a set of sidelink resources for communicating directly with a second wireless device; determine one or more reservation periods associated with resources of the sidelink resources pool; determine a number of sensing occasions based on the one or more reservation periods; sense a wireless medium within the sidelink resources pool based on the determined number of sensing occasions and the determined one or more reservation periods; select a set of candidate resources from the sidelink resources pool based on the sensing; and transmit data to the second wireless device based on the selected set of candidate resources.

Example 26 comprises the subject matter of example 25, wherein determining the number of sensing occasions is also based on a maximum sensing threshold number.

Example 27 comprises the subject matter of example 26, wherein the maximum sensing threshold number is predetermined based on the sidelink resources pool.

Example 28 comprises the subject matter of examples 25-27, wherein the sidelink resources pool includes a first subset of sidelink resources based on a first set of reservation periods and a second subset of sidelink resources based on a second set of reservation periods, wherein the first subset of sidelink resources and the second subset of sidelink resources indicate sets of sensing occasions, and wherein the first subset of sidelink resources includes more sidelink resources than the second subset of sidelink resources.

Example 29 comprises the subject matter of example 28, wherein the first subset of sidelink resources comprises all resource reservation periods configured in the sidelink resources pool, and wherein the second subset of sidelink resources comprises less than all of the resource reservation periods configured in the sidelink resources pool.

Example 30 comprises the subject matter of examples 28-29, wherein the processor is further configured to select the first subset of sidelink resources or the second subset of sidelink resources based on a configuration of the first wireless device, and wherein the sensing is based on the selected subset of sidelink resources.

Example 31 comprises the subject matter of examples 28-30, wherein the processor is further configured to: monitor the wireless medium to determine a channel busy ratio; and select the first subset of sidelink resources or the second subset of sidelink resources based on the channel busy ratio, and wherein the sensing is based on the selected subset of sidelink resources.

Example 32 comprises the subject matter of examples 28-31, wherein the processor is further configured to select the first subset of sidelink resources or the second subset of sidelink resources based on a periodicity of data to be transmitted to the second wireless device, and wherein the sensing is based on the selected subset of sidelink resources.

Example 33 comprises the subject matter of examples 28-32, wherein the processor is further configured to select the first subset of sidelink resources or the second subset of sidelink resources based on whether the first wireless device is configured to perform contiguous partial sensing, and wherein the sensing is based on the selected subset of sidelink resources.

Example 34 comprises the subject matter of examples 28-33, wherein the processor is further configured to select the first subset of sidelink resources or the second subset of sidelink resources based on an amount of allowable delay associated with data to the transmitted, and wherein the sensing is based on the selected subset of sidelink resources.

Example 35 comprises the subject matter of examples 28-34, wherein the processor is further configured to select the first subset of sidelink resources or the second subset of sidelink resources based on an amount of allowable retransmissions associated with data to the transmitted, and wherein the sensing is based on the selected subset of sidelink resources.

Example 36 comprises the subject matter of examples 25-35, wherein the processor is further configured to receive an indication of data for transmission to the second wireless device and wherein the sensing is performed before the receiving.

Example 37 comprises the subject matter of examples 25-35, wherein the processor is further configured to determine to perform contiguous partial sensing based on a configuration associated with the sidelink resources pool and a received indication to perform contiguous partial sensing.

Example 38 comprises the subject matter of example s 25-35, wherein the processor is further configured to: receive an indication of data for transmission to the second wireless device; and determine whether to perform sensing after the receiving based on whether the first wireless device is configured to perform contiguous partial sensing and the type of the data for transmission.

Example 39 comprises the subject matter of example 38, wherein the first wireless device is configured to perform contiguous partial sensing after receiving the indication of data and before a first candidate resource of the selected set of candidate resources.

According to example 40, a first wireless device comprising: a radio; and a processor operably coupled to the radio, wherein the processor is configured to: determine, by a first wireless device, a sidelink resources pool including a set of sidelink resources for communicating directly with a second wireless device; sense a wireless medium within the sidelink resources pool; selecting a set of candidate resources from the sidelink resources pool based on the sensing; receive a coordination message from a third wireless device, the coordination message indicating a first set of identified resources by the third wireless device; select a second set of identified resources based on the set of candidate resources and first set of identified resources; and transmit the selected second set of identified resources to the second wireless device.

Example 41 comprises the subject matter of example 40, wherein the first set of identified resources comprises an indication of preferred sidelink resources for the first wireless device.

Example 42 comprises the subject matter of example 41, wherein selecting the second set is based on an intersection between the set of candidate resources and the first set of identified resources.

Example 43 comprises the subject matter of example 41, wherein the processor is further configured to determine a third set of preferred sidelink resources for the first wireless device and wherein selecting the second set comprises a union between the first set of identified resources and the determined third set of preferred sidelink resources.

Example 44 comprises the subject matter of example 40, wherein the first set of identified resources comprises an indication of non-preferred sidelink resources for the first wireless device.

Example 45 comprises the subject matter of example 44, wherein selecting the second set is based on an excluding the first set of identified resources from the set of candidate resources.

Example 46 comprises the subject matter of example 44, wherein the processor is further configured to determine a third set of non-preferred sidelink resources for the first wireless device and wherein selecting the second set comprises a union between the first set of identified resources and the determined third set of non-preferred sidelink resources.

Example 47 comprises the subject matter of example 40, wherein selecting the second set further comprises excluding the first set of identified resources if the first set of identified resources are: identified as being preferred sidelink resources in the coordination message, or identified as being non-preferred sidelink resources in the coordination message.

Example 48 comprises the subject matter of example 47, further comprising transmitting a coordination message to the third wireless device based on the second set of identified resources.

According to Example 49, a method that includes any action or combination of actions as substantially described herein in the Detailed Description.

According to Example 50, a method as substantially described herein with reference to each or any combination of the Figures included herein or with reference to each or any combination of paragraphs in the Detailed Description.

According to Example 51, a wireless device configured to perform any action or combination of actions as substantially described herein in the Detailed Description as included in the wireless device.

According to Example 52, a wireless station configured to perform any action or combination of actions as substantially described herein in the Detailed Description as included in the wireless station.

According to Example 53, a non-volatile computer-readable medium that stores instructions that, when executed, cause the performance of any action or combination of actions as substantially described herein in the Detailed Description.

According to Example 54, an integrated circuit configured to perform any action or combination of actions as substantially described herein in the Detailed Description.

Yet another exemplary aspect may include a method, comprising, by a device, performing any or all parts of the preceding Examples.

A yet further exemplary aspect may include a non-transitory computer-accessible memory medium comprising program instructions which, when executed at a device, cause the device to implement any or all parts of any of the preceding Examples.

A still further exemplary aspect may include a computer program comprising instructions for performing any or all parts of any of the preceding Examples.

Yet another exemplary aspect may include an apparatus comprising means for performing any or all of the elements of any of the preceding Examples.

Still another exemplary aspect may include an apparatus comprising a processor configured to cause a device to perform any or all of the elements of any of the preceding Examples.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Aspects of the present disclosure may be realized in any of various forms. For example, some aspects may be realized as a computer-implemented method, a computer-readable memory medium, or a computer system. Other aspects may be realized using one or more custom-designed hardware devices such as ASICs. Still other aspects may be realized using one or more programmable hardware elements such as FPGAs.

In some aspects, a non-transitory computer-readable memory medium may be configured so that it stores program instructions and/or data, where the program instructions, if executed by a computer system, cause the computer system to perform a method, e.g., any of a method aspects described herein, or, any combination of the method aspects described herein, or, any subset of any of the method aspects described herein, or, any combination of such subsets.

In some aspects, a device (e.g., a UE 106, a BS 102, a network element 600) may be configured to include a processor (or a set of processors) and a memory medium, where the memory medium stores program instructions, where the processor is configured to read and execute the program instructions from the memory medium, where the program instructions are executable to implement any of the various method aspects described herein (or, any combination of the method aspects described herein, or, any subset of any of the method aspects described herein, or, any combination of such subsets). The device may be realized in any of various forms.

Although the aspects above have been described in considerable detail. numerous variations and modifications will become apparent to those skilled in the art once the above disclosure is fully appreciated. It is intended that the following claims be interpreted to embrace all such variations and modifications.

What is claimed is:

1. A method for wireless communications performed by a first wireless device, the method comprising:
    determining a sidelink resources pool including a set of sidelink resources for communicating directly with a second wireless device;
    determining one or more reservation periods associated with resources of the sidelink resources pool, wherein the sidelink resources pool includes a first subset of sidelink resources based on a first set of reservation periods and a second subset of sidelink resources based on a second set of reservation periods, and wherein the first subset of sidelink resources includes more sidelink resources than the second subset of sidelink resources;
    determining a number of sensing occasions based on the one or more reservation periods, wherein the first subset of sidelink resources and the second subset of sidelink resources indicate sets of sensing occasions;
    sensing a wireless medium within the sidelink resources pool based on the determined number of sensing occasions and the determined one or more reservation periods;
    selecting a set of candidate resources from the sidelink resources pool based on the sensing; and
    transmitting data to the second wireless device based on the selected set of candidate resources.

2. The method of claim 1, wherein determining the number of sensing occasions is also based on a maximum sensing threshold number.

3. The method of claim 1, further comprising selecting the first subset of sidelink resources or the second subset of sidelink resources based on at least one of:
    a periodicity of data to be transmitted to the second wireless device;
    whether the first wireless device is configured to perform contiguous partial sensing;
    an amount of allowable delay associated with data to be transmitted;
    an amount of allowable retransmissions associated with data to be transmitted; and
    a configuration of the first wireless device,
    wherein the sensing is based on the selected subset of sidelink resources.

4. The method of claim 1, further comprising:
    monitoring the wireless medium to determine a channel busy ratio; and
    selecting the first subset of sidelink resources or the second subset of sidelink resources based on the channel busy ratio, and wherein the sensing is based on the selected subset of sidelink resources.

5. The method of claim 1, further comprising receiving an indication of data for transmission to the second wireless device, wherein the sensing is performed before the receiving.

6. The method of claim 1, further comprising determining to perform contiguous partial sensing based on a configuration associated with the sidelink resources pool and a received indication to perform contiguous partial sensing.

7. A method for wireless communications comprising:
    determining, by a first wireless device, a sidelink resources pool including a set of sidelink resources for communicating directly with a second wireless device;
    sensing a wireless medium within the sidelink resources pool;
    selecting a set of candidate resources from the sidelink resources pool based on the sensing;
    receiving a coordination message from a third wireless device, the coordination message indicating a first set of identified resources by the third wireless device;
    selecting a second set of identified resources based on the set of candidate resources and first set of identified resources; and
    transmitting the selected second set of identified resources to the second wireless device.

8. The method of claim 7, wherein the first set of identified resources comprises an indication of preferred sidelink resources for the first wireless device.

9. The method of claim 8, wherein selecting the second set is based on an intersection between the set of candidate resources and the first set of identified resources.

10. The method of claim 7, further comprising determining a third set of preferred sidelink resources for the first wireless device, wherein selecting the second set comprises a union between the first set of identified resources and the determined third set of preferred sidelink resources.

11. The method of claim 7, wherein the first set of identified resources comprises an indication of non-preferred sidelink resources for the first wireless device.

12. The method of claim 11, wherein selecting the second set is based on excluding the first set of identified resources from the set of candidate resources.

13. A first wireless device comprising:
a radio; and
a processor operably coupled to the radio,
wherein the processor is configured to:
determine a sidelink resources pool including a set of sidelink resources for communicating directly with a second wireless device;
determine one or more reservation periods associated with resources of the sidelink resources pool,
wherein the sidelink resources pool includes a first subset of sidelink resources based on a first set of reservation periods and a second subset of sidelink resources based on a second set of reservation periods, and wherein the first subset of sidelink resources includes more sidelink resources than the second subset of sidelink resources;
determine a number of sensing occasions based on the one or more reservation periods, wherein the first subset of sidelink resources and the second subset of sidelink resources indicate sets of sensing occasions;
sense a wireless medium within the sidelink resources pool based on the determined number of sensing occasions and the determined one or more reservation periods;
select a set of candidate resources from the sidelink resources pool based on the sensing; and
transmit data to the second wireless device based on the selected set of candidate resources.

14. The first wireless device of claim 13, wherein determining the number of sensing occasions is also based on a maximum sensing threshold number.

15. The first wireless device of claim 13, wherein the processor is further configured to select the first subset of sidelink resources or the second subset of sidelink resources based on at least one of:
a periodicity of data to be transmitted to the second wireless device;
whether the first wireless device is configured to perform contiguous partial sensing;
an amount of allowable delay associated with data to be transmitted; and
an amount of allowable retransmissions associated with data to be transmitted,
wherein the sensing is based on the selected subset of sidelink resources.

16. The first wireless device of claim 13, wherein the processor is further configured to:
monitor the wireless medium to determine a channel busy ratio; and
select the first subset of sidelink resources or the second subset of sidelink resources based on the channel busy ratio, and wherein the sensing is based on the selected subset of sidelink resources.

17. The first wireless device of claim 13, wherein the processor is further configured to receive an indication of data for transmission to the second wireless device and wherein the sensing is performed before the receiving.

18. The first wireless device of claim 13, wherein the processor is further configured to determine to perform contiguous partial sensing based on a configuration associated with the sidelink resources pool and a received indication to perform contiguous partial sensing.

* * * * *